United States Patent
Kishimoto et al.

(10) Patent No.: US 7,196,977 B2
(45) Date of Patent: Mar. 27, 2007

(54) TRACK JUMP CONTROL CIRCUIT FOR ACCESSING OPTICAL DISK DRIVE

(75) Inventors: Takashi Kishimoto, Nara (JP); Katsuya Watanabe, Nara (JP); Kenji Fujiune, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 615 days.

(21) Appl. No.: 10/669,809

(22) Filed: Sep. 25, 2003

(65) Prior Publication Data

US 2004/0141429 A1 Jul. 22, 2004

(30) Foreign Application Priority Data

Oct. 31, 2002 (JP) ............................. 2002-318188

(51) Int. Cl.
*B11B 21/08* (2006.01)

(52) U.S. Cl. .................................... 369/30.17

(58) Field of Classification Search ................. None
See application file for complete search history.

(56) References Cited

U.S. PATENT DOCUMENTS 4,932,013 A * 6/1990 Kojima et al. ........... 369/30.17
5,101,386 A * 3/1992 Kojima et al. ............. 369/30.1
5,195,067 A * 3/1993 Yanagi ..................... 369/30.17
5,195,069 A * 3/1993 Nakano .................... 369/30.16
5,307,333 A * 4/1994 Ikeda et al. ............... 369/44.28
6,181,651 B1 * 1/2001 Kishimoto et al. ....... 369/30.16
6,628,580 B1 * 9/2003 Kishimoto et al. ....... 369/30.16
6,721,239 B2 * 4/2004 Kishimoto et al. ....... 369/30.17

FOREIGN PATENT DOCUMENTS

JP       5-234103        9/1993
JP       2000-353324     12/2000

OTHER PUBLICATIONS

Optical Recording and Reproducing Device, (JP, 2000-353,324), Kishimoto et al, Dec. 19, 2000, abstract only.*

* cited by examiner

Primary Examiner—Tan Dinh
(74) Attorney, Agent, or Firm—Wenderoth, Lind & Ponack, L.L.P.

(57) ABSTRACT

In track jumping operation, an acceleration/deceleration pulse generation portion measures the TE signal amplitude during track jumping, and modifies the acceleration/deceleration time of the acceleration/deceleration pulse according to the measured amplitude to drive a tracking actuator. Also, the acceleration/deceleration pulse generation portion measures the movement time from the start of acceleration until a certain location is reached, and modifies the peak value of the deceleration pulse according to the measured time to drive the tracking actuator.

40 Claims, 16 Drawing Sheets

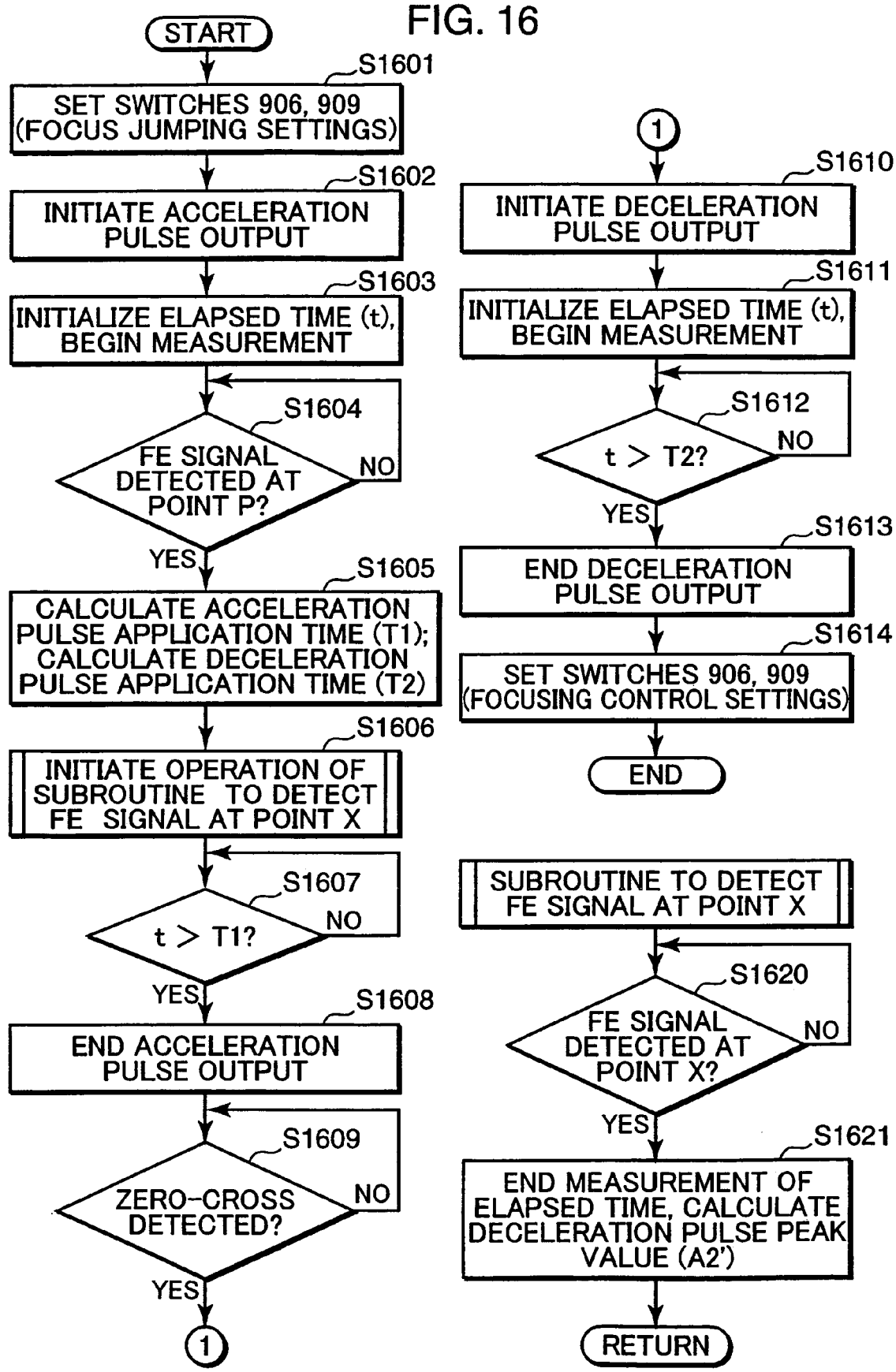

TRACK JUMP CONTROL CIRCUIT FOR ACCESSING OPTICAL DISK DRIVE

BACKGROUND OF THE INVENTION

1. Field of the Invention

This invention relates to an optical disc device which utilizes a light beam from a laser or other light source to optically record information onto an information carrier or reproduce information from an information carrier, and to a track jumping control circuit and focus jumping control circuit used in this device; more specifically, this invention relates to track jumping control for movement from a track to another adjacent track, and to focus jumping control for movement from one data surface to another adjacent data surface in an information carrier having a plurality of data surfaces.

2. Description of the Related Art

When seeking a desired track in an optical disc device of the prior art, if the movement distance to the track is long, the entire optical head comprising the tracking actuator is moved in the radial direction of the information carrier with tracking operation halted, and by counting the number of tracks traversed on the information carrier by the light beam, the light beam is moved to the desired track.

On the other hand, when the number of tracks to the desired track is several tracks, acceleration/deceleration pulses are applied to the tracking actuator while performing tracking operation in order to reliably and stably reach the desired track, and by repeating track jumping to adjacent tracks the light beam is moved to the desired track on the information carrier. As the most basic method of such track jumping control, an acceleration pulse with a prescribed peak value is output for a prescribed length of time, and when a TE (tracking error) signal zero-cross point is subsequently detected, a deceleration pulse with a prescribed peak value is output for a prescribed length of time.

In an information carrier having a plurality of data surfaces, focus jumping control to move from one data surface to another adjacent data surface generally is performed similarly to track jumping control, by applying acceleration/deceleration pulses with prescribed peak values and for prescribed lengths of time to the focus actuator.

In the above track jumping control, as another track jumping method, Japanese Patent Laid-open No. 5-234103 discloses a method in which an acceleration pulse with prescribed peak value is output until the TE signal zero-cross point, after which a deceleration pulse with the same peak value as the acceleration pulse is output until a certain level of the TE signal prior to the on-track state is detected. And, Japanese Patent Laid-open No. 2000-353324 discloses a method in which an acceleration pulse with a prescribed peak value is output until a certain level of the TE signal is detected, and the peak value of the deceleration pulse output after detection of the TE signal zero-cross point is varied according to the time from the initiation of acceleration until this level is detected.

However, in the former track jumping method an acceleration or deceleration pulse with the same peak value is applied, until the TE signal zero-cross point in the case of acceleration, and until before the TE signal on-track state in the case of deceleration, so that the energy applied to the tracking actuator is different during acceleration and during deceleration. Consequently the velocity of motion of the light beam after the end of the deceleration pulse cannot be reduced sufficiently, and track jumping becomes unstable. Also, when the device is subjected to vibrations, there is partial eccentricity of optical discs, or other external disturbances occur, there is scattering in the velocity of motion of the light beam after the end of the deceleration pulse, and track jumping becomes unstable.

On the other hand, in the latter track jumping method stable track jumping is possible even when there are external disturbances, but detection of external disturbances is based on the time of motion from the initiation of acceleration to a certain location. Hence even when there are no external disturbances, scattering may occur in the time of motion from the initiation of acceleration to a certain location due to TE signal amplitude fluctuations arising from scattering in the optical disc track pitch, and it is difficult to separate external disturbances from scattering in the track pitch, so that track jumping may become unstable.

SUMMARY OF THE INVENTION

An object of this invention is to provide an optical disc device capable of stable reproduction and recording, which has stable track jumping performance with respect to optical disc track pitch scattering even in cases when there are external disturbances due to vibration of the optical disc device, partial eccentricity of the optical disc, and similar, as well as a track jumping control circuit used in this device.

A further object of this invention is to provide an optical disc device capable of stable reproduction and recording, which has stable focus jumping performance with respect to optical disc substrate thickness scattering even in cases when there are external disturbances due to vibration of the optical disc device, partial run-out of the optical disc, and similar, as well as a focus jumping control circuit used in this device.

An optical disc device according to one aspect of this invention comprises movement means which moves the focal spot of a light beam focused on the information carrier in a direction which traverses tracks on the information carrier; detracking detection means which generates a signal according to the positional relation of the focal spot of the light beam and a track; tracking control means which drives the above movement means according to the signal output from the above detracking detection means, and controls scanning of tracks by the focal spot of the light beam; and track jumping means which moves the focal spot of the light beam from a first track on the information carrier to an adjacent second track; wherein the above track jumping means comprises acceleration means which applies to the above movement means an acceleration signal to accelerate the light beam, deceleration means which applies to the above movement means a deceleration signal to decelerate the light beam which has been accelerated by the above acceleration means, and amplitude measurement means which measures the amplitude of the output signal from the above detracking detection means during operation of the above acceleration means; the above acceleration means modifies the time of the acceleration signal based on the amplitude measured by the above amplitude measurement means; and, the above deceleration means modifies the time of the deceleration signal based on the amplitude measured by the above amplitude measurement means.

In this optical disc device, during track jumping to an adjacent track the TE signal amplitude during jumping is measured, the acceleration/deceleration times of the acceleration/deceleration pulses are varied according to the measured amplitude, and the tracking actuator is driven. Hence an optical disc device can be provided such that, even when there are external disturbances due to device vibrations, partial eccentricity of the optical disc or other causes, track jumping performance is stable even with respect to scattering in the optical disc track pitch, and stable reproduction and recording are possible.

An optical disc device according to another aspect of this invention comprises movement means which moves the focal spot of a light beam focused on the information carrier in a direction which traverses tracks on the information carrier; detracking detection means which generates a signal according to the positional relation of the focal spot of the light beam and a track; tracking control means which drives the above movement means according to the signal output from the above detracking detection means, and controls scanning of tracks by the focal spot of the light beam; and track jumping means which moves the focal spot of the light beam from a first track on the information carrier to an adjacent second track; wherein the above track jumping means comprises acceleration means which applies to the above movement means an acceleration signal to accelerate the light beam, deceleration means which applies to the above movement means a deceleration signal to decelerate the light beam which has been accelerated by the above acceleration means, first amplitude measurement means which measures the amplitude of the output signal from the above detracking detection means during operation of the above acceleration means, and second amplitude measurement means which measures the amplitude of the output signal from the above detracking detection means during operation of the above deceleration means; the above acceleration means modifies the time of the acceleration signal based on the amplitude measured by the above first amplitude measurement means; and, the above deceleration means modifies the time of the deceleration signal based on the amplitude measured by the above second amplitude measurement means.

In this optical disc device, upon track jumping to an adjacent track the TE signal amplitude is measured during acceleration and deceleration, the acceleration/deceleration times of the acceleration/deceleration pulses are varied according to the measured amplitude, and the tracking actuator is driven. Hence an optical disc device can be provided such that, even when there are external disturbances due to device vibrations, partial eccentricity of the optical disc or other causes, track jumping performance is stable even with respect to scattering in the optical disc track pitch, and stable reproduction and recording are possible.

An optical disc device according to still another aspect of this invention comprises movement means which moves the focal spot of a light beam focused on the information carrier in a direction which traverses tracks on the information carrier; detracking detection means which generates a signal according to the positional relation of the focal spot of the light beam and a track; tracking control means which drives the above movement means according to the signal output from the above detracking detection means, and controls scanning of tracks by the focal spot of the light beam; and track jumping means which moves the focal spot of the light beam from a first track on the information carrier to an adjacent second track; wherein the above track jumping means comprises acceleration means which applies to the above movement means an acceleration signal to accelerate the light beam, deceleration means which applies to the above movement means a deceleration signal to decelerate the light beam which has been accelerated by the above acceleration means, amplitude measurement means which measures the amplitude of the output signal from the above detracking detection means during operation of the above acceleration means, and movement time measurement means which measures the length of time from the time at which movement of the light beam is initiated by the above track jumping means until a prescribed location between the above first track and the above second track is reached; the above acceleration means modifies the time of the acceleration signal based on the amplitude measured by the above amplitude measurement means; and, the above deceleration means modifies the time and the peak value of the deceleration signal based on the amplitude measured by the above amplitude measurement means and the time measured by the above movement time measurement means.

In this optical disc device, upon track jumping to an adjacent track the TE signal amplitude is measured during jumping, the acceleration/deceleration times of the acceleration/deceleration pulses are varied according to the measured amplitude, and the tracking actuator is driven. Further, the movement time from the initiation of acceleration until a certain location is measured, the peak value of the deceleration pulse is varied according to the measured time, and the tracking actuator is driven. Hence an optical disc device can be provided such that, even when there are external disturbances due to device vibrations, partial eccentricity of the optical disc or other causes, track jumping performance is stable even with respect to scattering in the optical disc track pitch, and stable reproduction and recording are possible.

An optical disc device according to still another aspect of this invention comprises movement means which moves the focal spot of a light beam focused on the information carrier in a direction which traverses tracks on the information carrier; detracking detection means which generates a signal according to the positional relation of the focal spot of the light beam and a track; tracking control means which drives the above movement means according to the signal output from the above detracking detection means, and controls scanning of tracks by the focal spot of the light beam; and track jumping means which moves the focal spot of the light beam from a first track on the information carrier to an adjacent second track; wherein the above track jumping means comprises acceleration means which applies to the above movement means an acceleration signal to accelerate the light beam, deceleration means which applies to the above movement means a deceleration signal to decelerate the light beam which has been accelerated by the above acceleration means, first amplitude measurement means which measures the amplitude of the output signal from the above detracking detection means during operation of the above acceleration means, second amplitude measurement means which measures the amplitude of the output signal from the above detracking detection means during operation of the above deceleration means, and movement time measurement means which measures the length of time from the time of initiation of movement of the light beam by the above track jumping means until a prescribed location between the above first track and the above second track is reached; the above acceleration means modifies the time of the acceleration signal based on the amplitude measured by the above first amplitude measurement means; and, the above deceleration means modifies the time and the peak value of the deceleration signal based on the amplitude measured by the above second amplitude measurement means and on the time measured by the above movement time measurement means.

In this optical disc device, upon track jumping to an adjacent track the TE signal amplitude is measured during acceleration and deceleration, the acceleration/deceleration times of the acceleration/deceleration pulses are varied according to the measured amplitude, and the tracking actuator is driven. Further, the movement time from the initiation of acceleration until a certain location is measured, the peak value of the deceleration pulse is modified according to the measured time, and the tracking actuator is driven. Hence an optical disc device can be provided such that, even when there are external disturbances due to device vibrations, partial eccentricity of the optical disc or other causes, track jumping performance is stable even with respect to scattering in the optical disc track pitch, and stable reproduction and recording are possible.

An optical disc device according to still another aspect of this invention comprises movement means which moves the focal spot of a light beam focused on the information carrier, having a plurality of stacked data surfaces, in a direction substantially perpendicular to the data surfaces; convergence state detection means which generates a signal according to the convergence state of the light beam; focusing control means which drives the above movement means according to the signal output from the above convergence state detection means, and controls the focus position of the light beam so as to be substantially constant; and focus jumping means which moves the focal spot of the light beam from a first data surface on the information carrier to an adjacent second data surface; wherein the above focus jumping means comprises acceleration means which applies to the above movement means an acceleration signal to accelerate the light beam, deceleration means which applies to the above movement means a deceleration signal to decelerate the light beam which has been accelerated by the above acceleration means, and amplitude measurement means which measures the amplitude of the output signal from the above convergence state detection means during operation of the above acceleration means; the above acceleration means modifies the time of the acceleration signal based on the amplitude measured by the above amplitude measurement means; and, the above deceleration means modifies the time of the deceleration signal based on the amplitude measured by the above amplitude measurement means.

In this optical disc device, during focus jumping from one data surface to another data surface the FE (focus error) signal amplitude during jumping is measured, the acceleration/deceleration times of the acceleration/deceleration pulses are varied according to the measured amplitude, and the focusing actuator is driven. Hence an optical disc device can be provided such that, even when there are external disturbances due to device vibrations, partial run-out of the optical disc or other causes, focus jumping performance is stable even with respect to scattering in the optical disc substrate thickness, and stable reproduction and recording are possible.

An optical disc device according to still another aspect of this invention comprises movement means which moves the focal spot of a light beam focused on the information carrier, having a plurality of stacked data surfaces, in a direction substantially perpendicular to the data surfaces; convergence state detection means which generates a signal according to the convergence state of the light beam; focusing control means which drives the above movement means according to the signal output from the above convergence state detection means, and controls the focus position of the light beam so as to be substantially constant; and focus jumping means which moves the focal spot of the light beam from a first data surface on the information carrier to an adjacent second data surface; wherein the above focus jumping means comprises acceleration means which applies to the above movement means an acceleration signal to accelerate the light beam, deceleration means which applies to the above movement means a deceleration signal to decelerate the light beam which has been accelerated by the above acceleration means, first amplitude measurement means which measures the amplitude of the output signal from the above convergence state detection means during operation of the above acceleration means, and second amplitude measurement means which measures the amplitude of the output signal from the above convergence state detection means during operation of the above deceleration means; the above acceleration means modifies the time of the acceleration signal based on the amplitude measured by the above first amplitude measurement means; and, the above deceleration means modifies the time of the deceleration signal based on the amplitude measured by the above second amplitude measurement means.

In this optical disc device, during focus jumping from one data surface to another data surface the FE signal amplitude during acceleration and deceleration is measured, the acceleration/deceleration times of the acceleration/deceleration pulses are varied according to the measured amplitude, and the focusing actuator is driven. Hence an optical disc device can be provided such that, even when there are external disturbances due to device vibrations, partial run-out of the optical disc or other causes, focus jumping performance is stable even with respect to scattering in the optical disc substrate thickness, and stable reproduction and recording are possible.

An optical disc device according to still another aspect of this invention comprises movement means which moves the focal spot of a light beam focused on the information carrier, having a plurality of stacked data surfaces, in a direction substantially perpendicular to the data surfaces; convergence state detection means which generates a signal according to the convergence state of the light beam; focusing control means which drives the above movement means according to the signal output from the above convergence state detection means, and controls the focus position of the light beam so as to be substantially constant; and focus jumping means which moves the focal spot of the light beam from a first data surface on the information carrier to an adjacent second data surface; wherein the above focus jumping means comprises acceleration means which applies to the above movement means an acceleration signal to accelerate the light beam, deceleration means which applies to the above movement means a deceleration signal to decelerate the light beam which has been accelerated by the above acceleration means, amplitude measurement means which measures the amplitude of the output signal from the above convergence state detection means during operation of the above acceleration means, and movement time measurement means which measures the length of time from the time of initiation of movement of the light beam by the above focus jumping means until an intermediate layer or a location near the boundary between the above first data surface and the above second data surface is reached; the above acceleration means modifies the time of the acceleration signal based on the amplitude measured by the above amplitude measurement means; and, the above deceleration means modifies the time and the peak value of the deceleration signal based on the amplitude measured by the above amplitude measurement means and on the time measured by the above movement time measurement means.

In this optical disc device, during focus jumping from one data surface to another data surface the FE signal amplitude during jumping is measured, the acceleration/deceleration times of the acceleration/deceleration pulses are varied according to the measured amplitude, and the focusing actuator is driven. Further, the movement time from the initiation of acceleration until a certain location is measured, the peak value of the deceleration pulse is modified according to the measured time, and the focusing actuator is driven. Hence an optical disc device can be provided such that, even when there are external disturbances due to device vibrations, partial run-out of the optical disc or other causes, focus jumping performance is stable even with respect to scattering in the optical disc substrate thickness, and stable reproduction and recording are possible.

An optical disc device according to still another aspect of this invention comprises movement means which moves the focal spot of a light beam focused on the information carrier, having a plurality of stacked data surfaces, in a direction substantially perpendicular to the data surfaces; convergence state detection means which generates a signal according to the convergence state of the light beam; focusing control means which drives the above movement means according to the signal output from the above convergence state detection means, and controls the focus position of the light beam so as to be, substantially constant; and focus jumping means which moves the focal spot of the light beam from a first data surface on the information carrier to an adjacent second data surface; wherein the above focus jumping means comprises acceleration means which applies to the above movement means an acceleration signal to accelerate the light beam, deceleration means which applies to the above movement means a deceleration signal to decelerate the light beam which has been accelerated by the above acceleration means, first amplitude measurement means which measures the amplitude of the output signal from the above convergence state detection means during operation of the above acceleration means, second amplitude measurement means which measures the amplitude of the output signal from the above convergence state detection means during operation of the above deceleration means, and movement time measurement means which measures the length of time from the time of initiation of movement of the light beam by the above focus jumping means until an intermediate layer or a location near the boundary between the above first data surface and the above second data surface is reached; the above acceleration means modifies the time of the acceleration signal based on the amplitude measured by the above first amplitude measurement means; and, the above deceleration means modifies the time and peak value of the deceleration signal based on the amplitude measured by the above second amplitude measurement means and on the time measured by the above movement time measurement means.

In this optical disc device, during focus jumping from one data surface to another data surface the FE signal amplitude during acceleration and deceleration is measured, the acceleration/deceleration times of the acceleration/deceleration pulses are varied according to the measured amplitude, and the focusing actuator is driven. Further, the movement time from the initiation of acceleration until a certain location is measured, the peak value of the deceleration pulse is modified according to the measured time, and the focusing actuator is driven. Hence an optical disc device can be provided such that, even when there are external disturbances due to device vibrations, partial run-out of the optical disc or other causes, focus jumping performance is stable even with respect to scattering in the optical disc substrate thickness, and stable reproduction and recording are possible.

These and other objects, features and advantages of the present invention will become more apparent upon reading the following detailed description along with the accompanying drawings.

DESCRIPTION OF THE PREFERRED EMBODIMENTS

Figure 1:
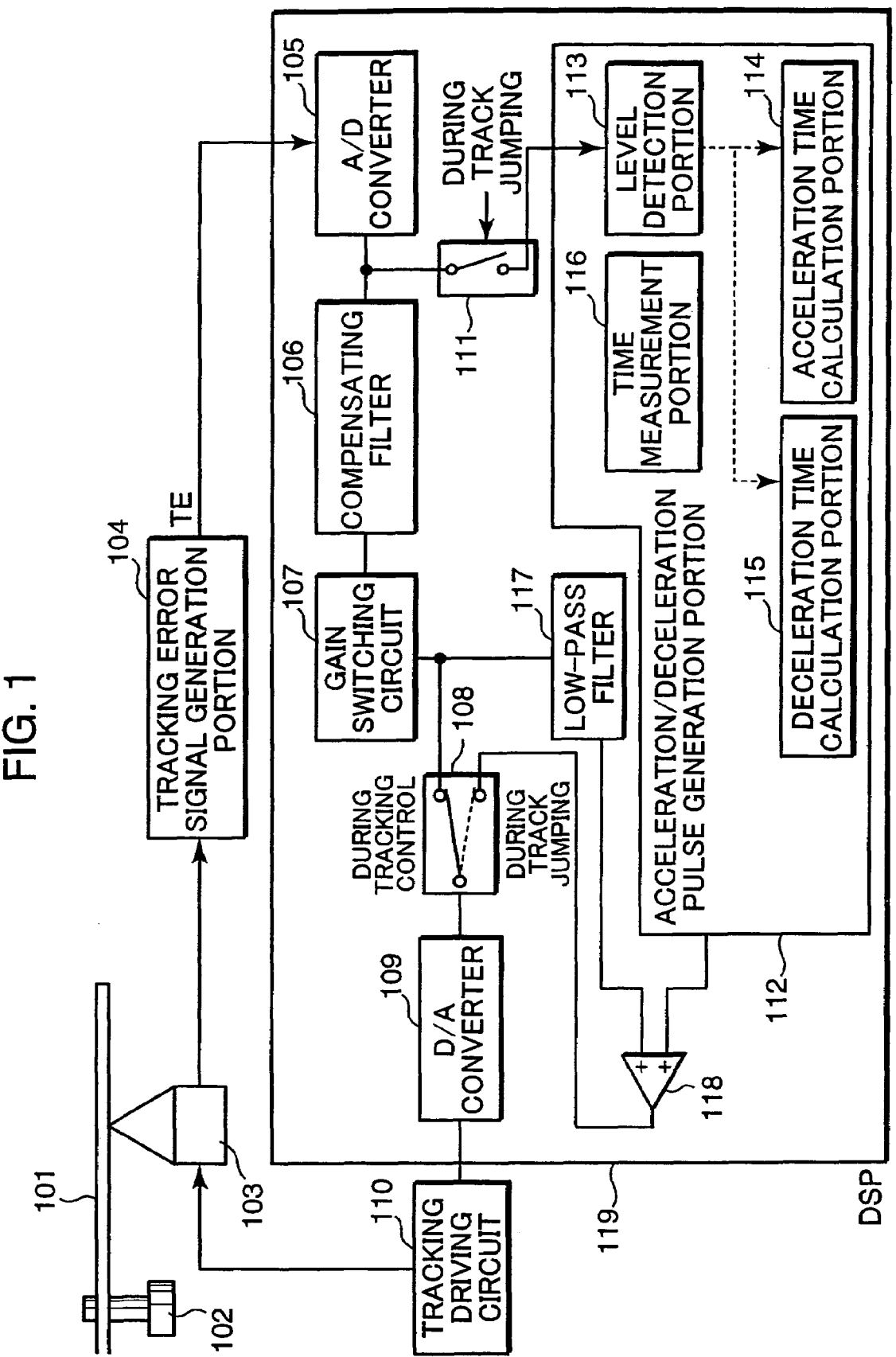
FIG. 1 is a block diagram showing the configuration of an optical disc device of a first embodiment of this invention.

Below, embodiments of this invention are explained in detail, referring to the drawings.

First Embodiment

FIG. 1 is a block diagram showing the configuration of an optical disc device of the first embodiment of this invention. The optical disc device shown in FIG. 1 comprises a disc motor 102 which rotates an optical disc 101 at a prescribed rotation rate, an optical head 103 which reproduces information from the optical disc 101, and a traverse motor (not shown) to move the entire optical head 103 in a direction perpendicular to the direction of tracks on the optical disc 101. Although not shown, the optical head 103 comprises a semiconductor laser or other light source, coupling lens, polarizing beam splitter, polarization plate, focusing lens, condensing lens, divided mirror, and photodetector.

The light beam generated by the light source of the optical head 103 is rendered into a parallel beam by the coupling lens, and is then reflected by the polarizing beam splitter and passes through the polarization plate. Then the light beam is focused by the focusing lens, and a light beam spot is formed so as to have a focal spot in the thickness direction of the optical disc 101. The light beam spot irradiates the optical disc 101, which is rotated by the disc motor 102.

On the other hand, light reflected from the optical disc 101 passes through the focusing lens, polarization plate, polarizing beam splitter, and condensing lens, and is divided into light beams in two directions by the dividing mirror. One of the divided light beams enters the focusing control device (not shown) via a photodetector with a two-segment structure in the optical head 103. An FE (focusing error) signal, which is a signal indicating the positional shift of the focal spot of the light beam with the optical disc 101 based on the difference in outputs from the photodetector, is detected, and based on the FE signal focusing control is executed such that the focal spot is positioned on the optical disc 101. As a result, the focused position of the light beam on the optical disc 101 is substantially constant. As the method of FE signal detection, a method called "SSD (Spot Size Detection)" is used; but because the configuration and operation of the focusing control device are not directly related to the tracking control of this embodiment, a detailed explanation is omitted.

The other light beam divided by the dividing mirror passes through a photodetector with a four-segment structure within the optical head 103, and is input to the tracking control device. The tracking control device comprises a tracking error signal generation portion 104, DSP (digital signal processor) 119, tracking driving circuit 110, and tracking actuator (not shown).

In the tracking error signal generation portion 104, signals output from the four-segment photodetector for the outside of the track are added, and signals output from the four-segment photodetector for the inside of the track are added. The signal resulting by subtracting the two signals resulting from addition becomes the TE (tracking error) signal, which is the detracking signal used to control the focal spot of the light beam so as to scan a track; this signal is input to the DSP 119. This TE signal detection method is called the "push-pull method".

In tracking control, the focusing lens is moved in the radial direction of the optical disc 101 by the tracking actuator. This tracking actuator comprises a moveable portion on which the focusing lens is mounted and a fixed portion; the moveable portion and the fixed portion are connected by four wires, by rubber, or by some other elastic member. When current is passed through a coil provided on the moveable portion, an electromagnetic force occurs between the coil and a permanent magnet provided on the fixed portion, and by means of this electromagnetic force the focusing lens is moved in the radial direction of the information carrier, that is, in a direction perpendicular to the tracks.

When seeking a desired track, if the movement distance to the track is long, the entire optical head 103 including the tracking actuator is moved in the radial direction of the optical disc 101 in the state in which tracking control is halted, and by counting the number of tracks traversed on the optical disc 101 by the light beam, the light beam is moved to the desired track.

On the other hand, when the number of tracks until the desired track is several tracks, acceleration and deceleration pulses are applied to the tracking actuator in the state in which tracking control is performed, in order to arrive at the desired data track stably and reliably, and track jumping to move to the adjacent track is repeated. In this track jumping, the acceleration/deceleration pulse generation portion 112 generates driving pulses (acceleration pulses or deceleration pulses), which are supplied to the tracking actuator.

Switches 108 and 111 are provided in the DSP 119. When it is necessary to execute tracking control, that is, when the optical disc device is in recording or reproduction mode, the switch 108 is set to the position indicated by the solid line, and the switch 111 is opened. When performing track jumping to an adjacent track during seeking, the switch 108 is set to the position indicated by the dashed line, and the switch 111 is closed. Hence the switch 108 operates to open and close the tracking control system loop, as well as operating to switch the driving signal applied to the tracking actuator during tracking control (during recording/reproduction mode) and during track jumping.

Next, recording/reproduction mode is explained. The TE signal input to the DSP 119 is converted from an analog signal to a digital signal by the A/D converter 105, and is input to the compensating filter 106. The compensating filter 106 is a digital filter comprising an adder, a multiplier, and a delay element, and compensates the phase in the tracking control system. A TE signal which has been phase-compensated by the compensating filter 106 is input, via the gain switching circuit 107 which switches the loop gain of the tracking control system, to the switch 108. The switch 108 is set to the position indicated by the solid line while in recording/reproduction mode, so that the TE signal passes through the switch 108, is converted from a digital signal to an analog signal by the D/A converter 109, and is input to the tracking driving circuit 110. The tracking driving circuit 110 performs appropriate current amplification and level conversion of the signal output from the DSP 119, to drive the tracking actuator.

As explained above, the tracking control system comprises a tracking error signal generation portion 104, A/D converter 105, compensating filter 106, gain switching circuit 107, D/A converter 109, tracking driving circuit 110, and tracking actuator; the tracking actuator is driven such that the focal spot of the light beam on the optical disc 101 scans along a prescribed track, to effect tracking control. When the focal spot of the light beam on the optical disc 101 scans along a track, transport control is performed such that the focal spot of the light beam and the center of the focusing lens coincide, that is, such that the optical axis of the light beam focused on and irradiating the optical disc 101 and the optical axis of the focusing lens coincide; however, an explanation is here omitted.

Figure 2:
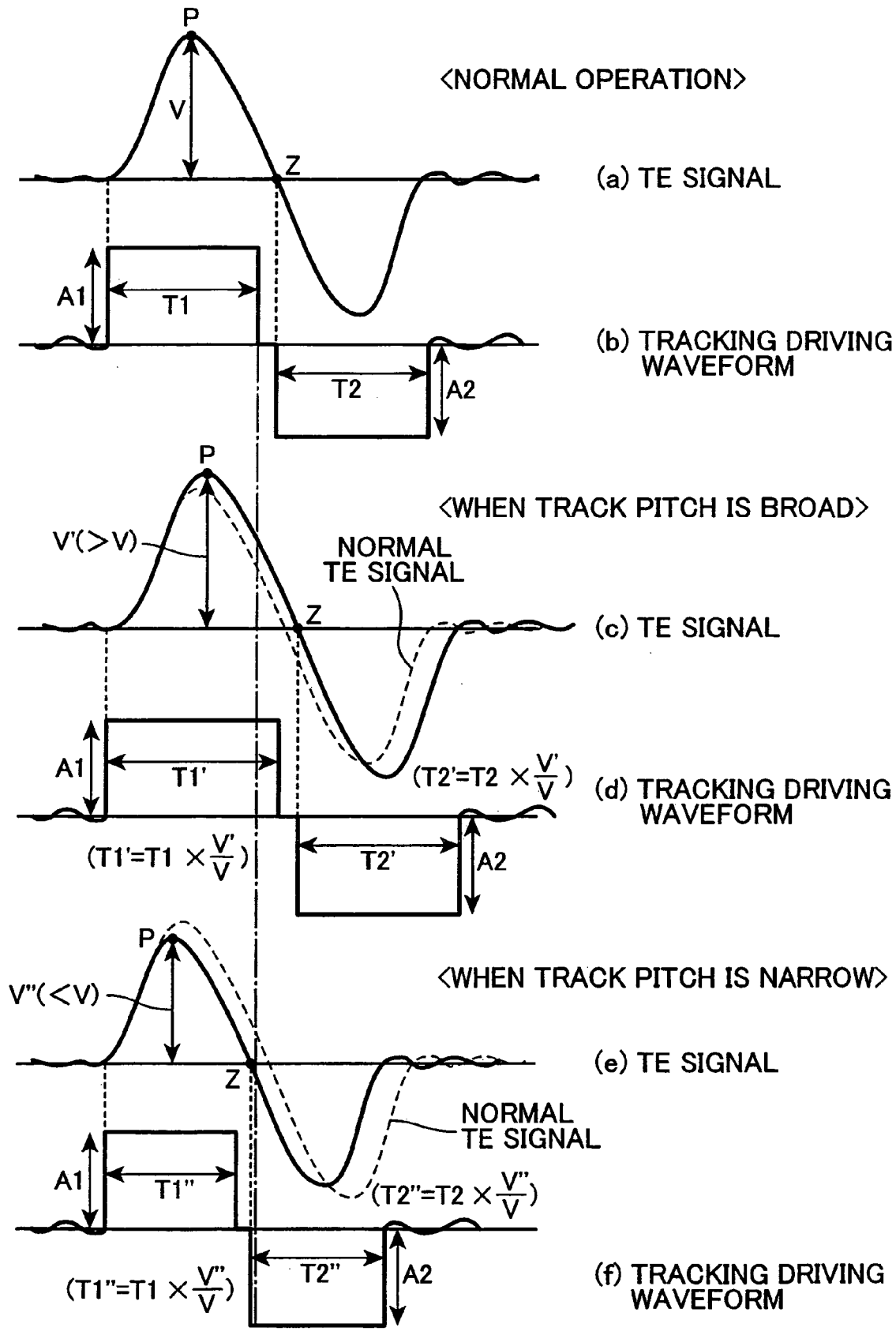
FIG. 2 is a timing chart showing the tracking error signal and tracking driving waveform of the track jumping method of the optical disc device shown in FIG. 1.
Figure 3:
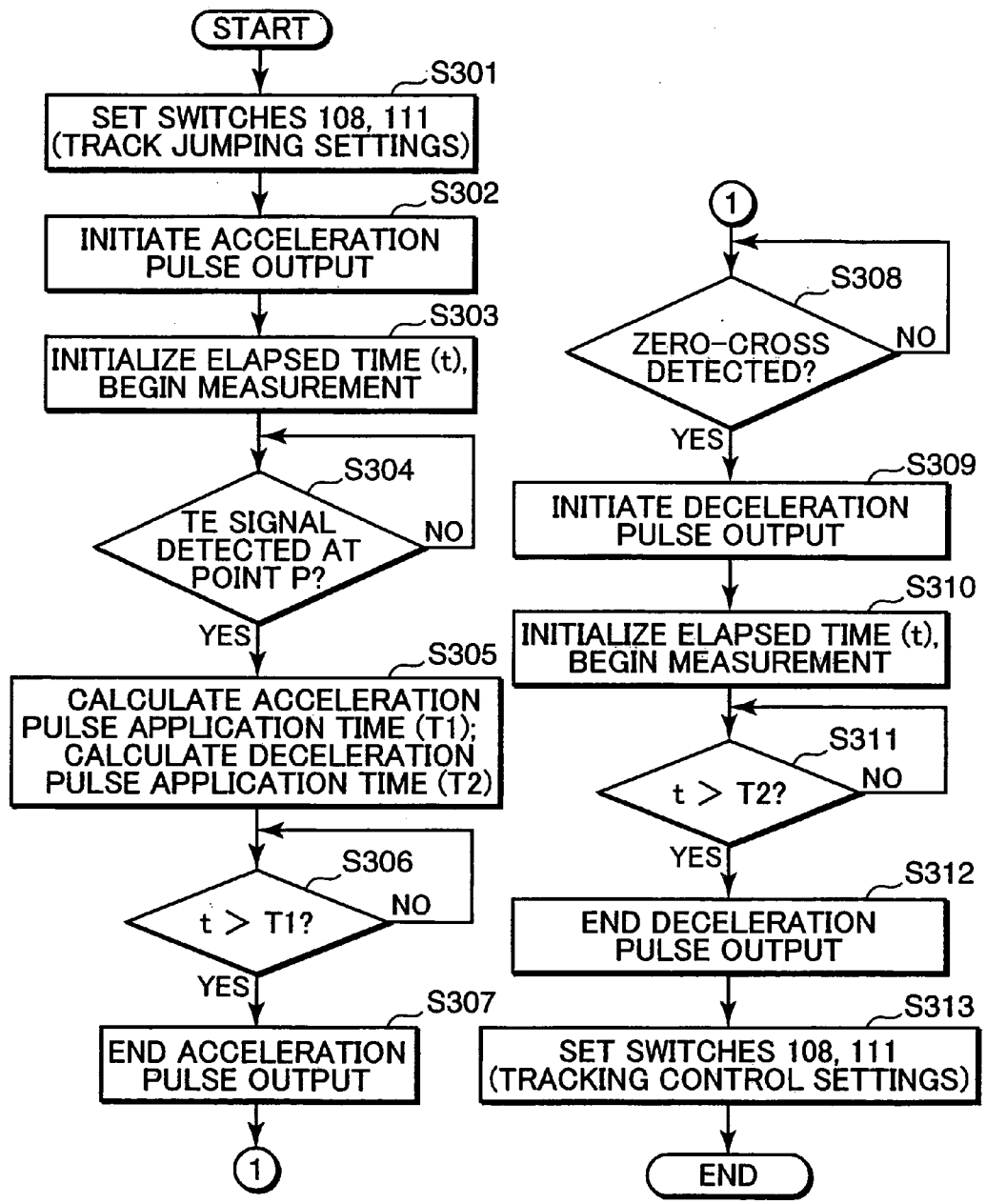
FIG. 3 is a flowchart which explains track jumping processing in the optical disc device of FIG. 1.

Next, the track jumping process of this embodiment is explained in detail, referring to the waveform diagram of FIG. 2 and flowchart of FIG. 3 in addition to the block diagram of FIG. 1.

FIG. 2 is a waveform diagram for track jumping toward an inner circumference; in FIG. 2, (a) is a normal TE signal, and (b) is a normal tracking driving waveform. Also, (c) and (d) are TE signal and tracking driving waveforms when the track pitch is broad, and (e) and (f) are TE signal and tracking driving waveforms when the track pitch is, in contrast, narrow. During track jumping toward an outer circumference, the polarities of the TE signal and tracking driving waveforms are simply inverted, and other respects are the same as for track jumping toward an inner circumference; hence the waveforms and a detailed explanation are omitted.

During track jumping, the acceleration/deceleration pulse generation portion 112 generates an acceleration pulse or deceleration pulse (acceleration/deceleration pulse signal), and the adder 118 adds the acceleration/deceleration pulse signal and the output of the low-pass filter 117. The added signal passes through the switch 108, D/A converter 109 and tracking driving circuit 110 and is applied to the tracking actuator. The acceleration/deceleration pulse generation portion 112 comprises a level detection portion 113 which measures the amplitude of the TE signal, a time measurement portion 116 which measures elapsed time, and an acceleration time calculation portion 114 and deceleration time calculation portion 115 which compute the length of time of application of an acceleration pulse or deceleration pulse according to the measurement result of the time measurement portion 116.

The switch 111 is set to the off position during tracking control (in recording/reproduction mode), but is set to the on position during track jumping. Hence a TE signal which is converted from an analog signal to a digital signal in the A/D converter 105 within the DSP 119 is input to the level detection portion 113. After setting the gain using the gain switching circuit 107 such that there is a prescribed loop gain for the TE signal, the signal is passed through the low-pass filter 117. The signal from the low-pass filter 117 is added to the acceleration/deceleration pulse signal in the adder 118, and the tracking actuator is driven by the addition signal thus obtained.

At this time, the cutoff frequency of the low-pass filter 117 is set sufficiently low that the eccentricity component of the optical disc passes adequately, so that the low-frequency component (eccentricity component) of the TE signal, added to the acceleration/deceleration pulse signal, drives the tracking actuator, and by this means instability in track jumping due to optical disc eccentricity is suppressed. As described below, the maximum value of the TE signal amplitude during acceleration is measured, and when the track pitch is judged to be broad or narrow, the time of application of the acceleration/deceleration pulse signal is modified.

Track jumping processing is here explained using the flowchart of FIG. 3. First, in step S301 the switch 108 is set to the position for track jumping indicated by the dashed line, and the switch 111 is set to the on position. Next, in step S302, by initiating output of the acceleration pulse (with prescribed peak value A1) generated by the acceleration/deceleration pulse generation portion 112, movement of the optical head 103 in the inner-circumference direction of the optical disc 101 is begun, and the appearance of a sinusoidal TE signal accompanies this. The method for setting the acceleration pulse peak value A1 is described below.

Together with the initiation of acceleration pulse output, in step S303 the time measurement portion 116 initializes the elapsed time (t), and then begins measurement. Next, in step S304 the level detection portion 113 detects the passage of the TE signal through point P in FIG. 2, and measures the TE signal amplitude (V' or V") at this time. Then, in step S305 the acceleration time calculation portion 114 calculates the acceleration pulse application time T1' (or T1") using the following eq. (1), and the deceleration time calculation portion 115 calculates the deceleration pulse application time T2' (or T2") using eq. (2) below, according to the measured maximum TE signal amplitude during acceleration.

$$\text{Acceleration pulse application time } T1' \text{ (or } T1") = T1 \times (V' \text{ (or } V")/V) \quad (1)$$

$$\text{Deceleration pulse application time } T2' \text{ (or } T2") = T2 \times (V' \text{ (or } V")/V) \quad (2)$$

Here T1 is the reference acceleration pulse application time, and T2 is the reference deceleration pulse application time. The method for setting T1 and T2 is described below.

Next, in steps S306 and S307 the time measurement portion 116 detects that the elapsed time is the time calculated using eq. (1), and after detection, the acceleration/deceleration pulse generation portion 112 ends the output of the acceleration pulse. Then, in step S308 processing remains in a wait state until the TE signal zero-cross point (point Z in FIG. 2) is detected. Here detection of the zero-cross point is performed by detecting, within the DSP 119, the point of intersection of the TE signal passing through the gain switching circuit 107, and the output signal of the low-pass filter 117.

After the TE signal zero-cross point is detected, in step S309 output of the deceleration pulse (with prescribed peak value A2) is begun, and from step S310 to S312 the deceleration pulse is output over the application time calculated using eq. (2). The method for setting A2 is described below.

Then, in step S313 the switch 108 is set to the position for tracking control (recording/reproduction mode) indicated by the solid line and the switch 111 is set to the off position, and by this means track jumping toward an inner adjacent circumference is ended and tracking control is resumed.

Next, the method for setting the acceleration pulse peak value A1, deceleration pulse peak value A2, reference acceleration pulse application time T1, and reference deceleration pulse application time T2 is explained. When there is no scattering in the track pitch of the optical disc 101, A1, A2, T1, and T2 are set according to the sensitivity of the tracking actuator such that stable track jumping can be performed. Here the peak values A1, A2 are set such that even for an eccentric disc, the signal passing through the adder 118 does not reach saturation. The values are also set such that the following eq. (3) holds, so that the energy applied to the tracking actuator is the same during acceleration and deceleration.

$$A1 \times T1 = A2 \times T2 \quad (3)$$

As explained above, acceleration/deceleration is not performed for a fixed length of time, but by modifying the acceleration/deceleration time according to the TE signal amplitude at the time of point P detection, fluctuations in the position of the optical head 103 at the end of deceleration arising from scattering in the track pitch are absorbed, and the positional relationship can be held constant. By this means, stable track jumping can be realized with respect to scattering in the track pitch of the optical disc 101.

Calculations to realize the tracking control means and calculations to realize the track jumping means are executed in the DSP 119 by a microcomputer program; the two are executed exclusively during tracking control and during track jumping by operation of the switch 108.

Also, due to fluctuations in the TE amplitude caused by track pitch scattering, the tracking control loop characteristics fluctuate immediately after the end of track jumping (when tracking control is resumed), so that by changing the setting of the gain switching circuit 107 according to the ratio of the measured amplitude to the reference amplitude calculated for acceleration, by for example increasing the gain by 1 dB over the normal value for a 2 ms interval after track jumping, more stable track jumping can be realized.

Second Embodiment

Next, the optical disc device of a second embodiment of this invention is explained. The optical disc device of this embodiment is realized by modifying the processing of the level detection portion 113 and deceleration time calculation portion 115 of the optical disc device shown in FIG. 1; the basic configuration is similar to that of the optical disc device of FIG. 1.

Below, track jumping in this embodiment is explained in detail, referring to the waveform diagram of FIG. 4 and flowchart of FIG. 5 in addition to the block diagram of FIG. 1.

Figure 4:
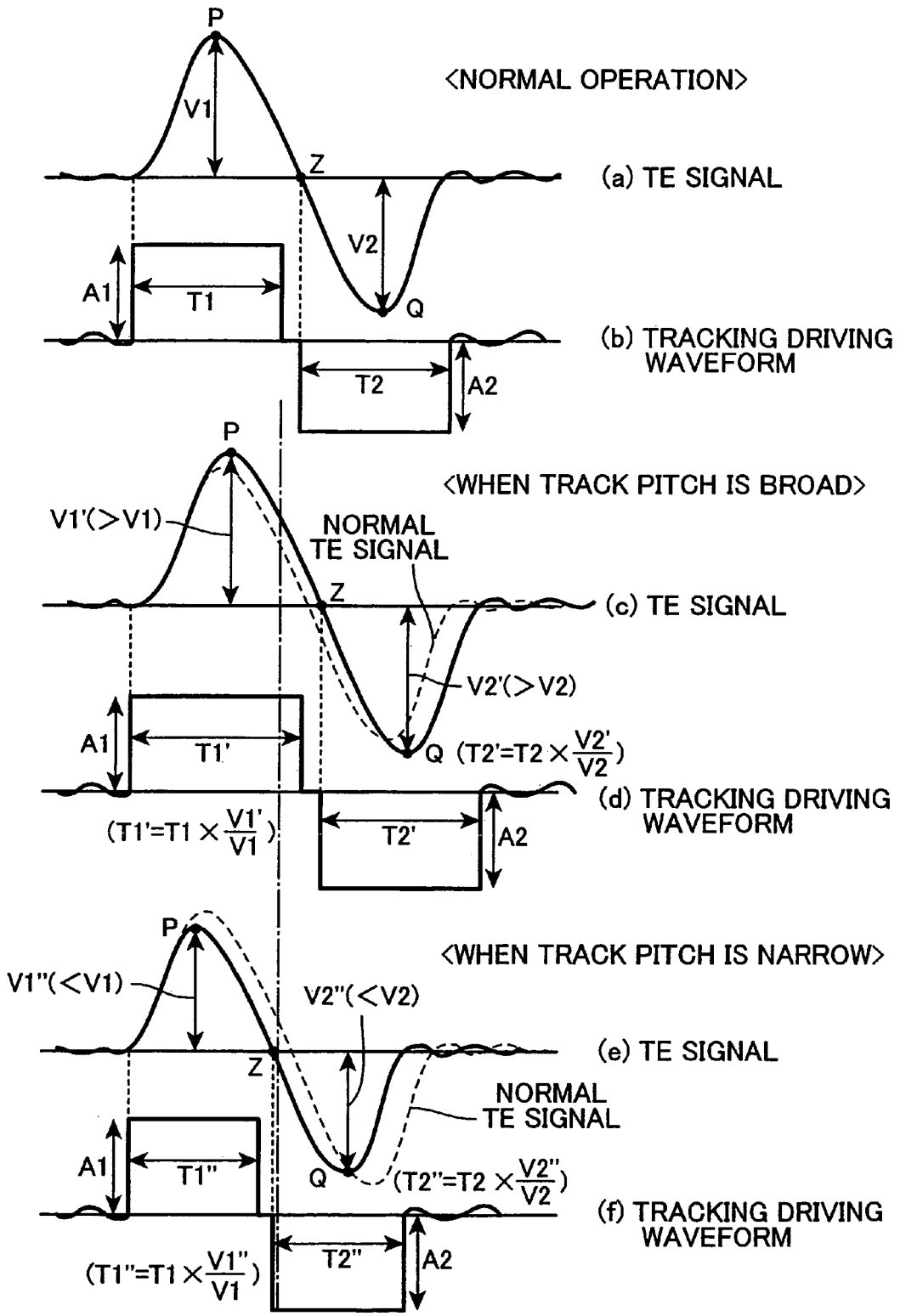
FIG. 4 is a timing chart showing the tracking error signal and tracking driving waveform of the track jumping method of the optical disc device of a second embodiment of this invention.

FIG. 4 is a waveform diagram for track jumping toward an inner circumference; in FIG. 4, (a) is the normal TE signal, and (b) is the normal tracking driving waveform. Also, (c) and (d) are the TE signal and tracking driving waveform for a broad track pitch, while (e) and (f) are, in contrast, the TE signal and tracking driving waveform for a narrow track pitch. During track jumping toward an outer circumference, the polarities of the TE signal and tracking driving waveforms are simply inverted, and other respects are the same as for track jumping toward an inner circumference; hence the waveforms and a detailed explanation are omitted.

In this embodiment, as explained in detail below, the maximum TE signal amplitude during acceleration is measured, and when the track pitch is judged to be broad or narrow, the application time of the acceleration pulse signal is modified; further, the maximum TE signal amplitude during deceleration is measured, and when the track pitch is judged to be broad or narrow, the application time of the deceleration pulse signal is modified.

Figure 5:
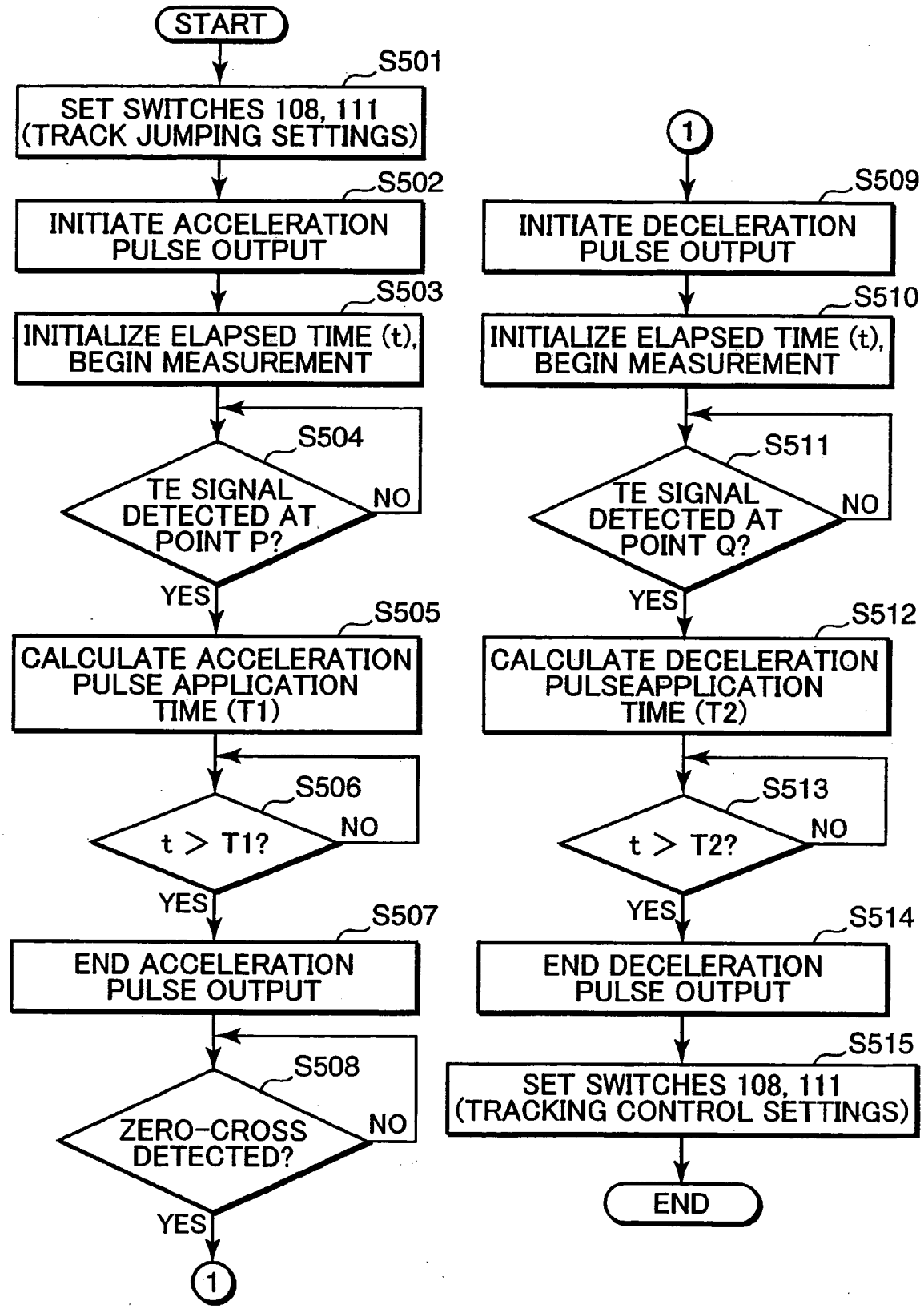
FIG. 5 is a flowchart which explains track jumping processing in the optical disc device of the second embodiment of this invention.

Track jumping processing is explained using the flowchart of FIG. 5. First, in step S501 the switch 108 is set to the position for track jumping indicated by the dashed line, and the switch 111 is set to the on position. Then in step S502 output of the acceleration pulse (with prescribed peak value A1) generated by the acceleration/deceleration pulse generation portion 112 is begun, and by this means movement of the optical head 103 toward an inner circumference of the optical disc 101 is begun; this is accompanied by the appearance of a sinusoidal TE signal.

Together with the initiation of acceleration pulse output, in step S503 the time measurement portion 116 initializes the elapsed time (t), and then begins measurement. Next, in step S504 the level detection portion 113 detects the passage of the TE signal through point P in FIG. 4, and measures the TE signal amplitude (V1' or V1") at this time. Then, in step S505 the acceleration time calculation portion 114 calculates the acceleration pulse application time T1' (or T1") using the following eq. (4), according to the measured maximum TE signal amplitude during acceleration.

$$\text{Acceleration pulse application time } T1' \text{ (or } T1'') = T1 \times (V1' \text{ (or } V1'')/V1) \quad (4)$$

Here, similarly to the first embodiment, T1 is the reference acceleration pulse application time.

Next, in steps S506 and S507 the time measurement portion 116 detects that the elapsed time is the time calculated using eq. (4), and after detection, the acceleration/deceleration pulse generation-portion 112 ends the output of the acceleration pulse. Then, in step S508 processing remains in a wait state until the TE signal zero-cross point (point Z in FIG. 4) is detected.

After the TE signal zero-cross point is detected, in step S509 output of the deceleration pulse (with prescribed peak value A2) is begun, and in step S510, after re-initializing the elapsed time (t), the time measurement portion 116 begins measurement. Next, in step S511 the level detection portion 113 detects the passage of the TE signal through the point Q in FIG. 4, and measures the TE signal-amplitude (V2' or V2") at this time. Further, in step S512 the deceleration time calculation portion 115 uses the following eq. (5) to calculate the deceleration pulse application time T2' (or T2") according to the maximum measured TE signal amplitude during deceleration.

$$\text{Deceleration pulse application time } T2' \text{ (or } T2'') = T2 \times (V2' \text{ (or } V2'')/V2) \quad (5)$$

Here, similarly to the first embodiment, T2 is the reference deceleration pulse application time.

Then, in steps S513 and S514 the time measurement portion 116 detects that the elapsed time is the time calculated using eq. (5), and after detection, the acceleration/deceleration pulse generation portion 112 ends the output of the deceleration pulse. Then in step S515, by setting the switch 108 to the tracking control position (recording/reproduction mode) indicated by the solid line and setting the switch 111 to the off position, track jumping to the adjacent track in the inner-circumference direction is ended, and tracking control is resumed.

As explained above, rather than performing acceleration/deceleration for a fixed length of time, by changing the acceleration time according to the TE signal amplitude at the time of detection of point P and changing the deceleration time according to the TE signal amplitude at the time of detection of point Q, variations in the position of the optical head 103 at the end of deceleration arising from scattering in the track pitch can be absorbed, and the positional relationship can be held constant. By this means, stable track jumping can be realized with respect to scattering in the track pitch of the optical disc 101.

Calculations to realize the tracking control means and calculations to realize the track jumping means are executed in the DSP 119 by a microcomputer program; the two are executed exclusively during tracking control and during track jumping by operation of the switch 108.

Similarly to the first embodiment, due to fluctuations in the TE amplitude caused by track pitch scattering, the tracking control loop characteristics fluctuate immediately after the end of track jumping (when tracking control is resumed), so that by changing the setting of the gain switching circuit 107 for a fixed length of time after the resumption of tracking control according to the ratio of the measured amplitude to the reference amplitude calculated for deceleration, still more stable track jumping can be realized.

Third Embodiment

Figure 6:
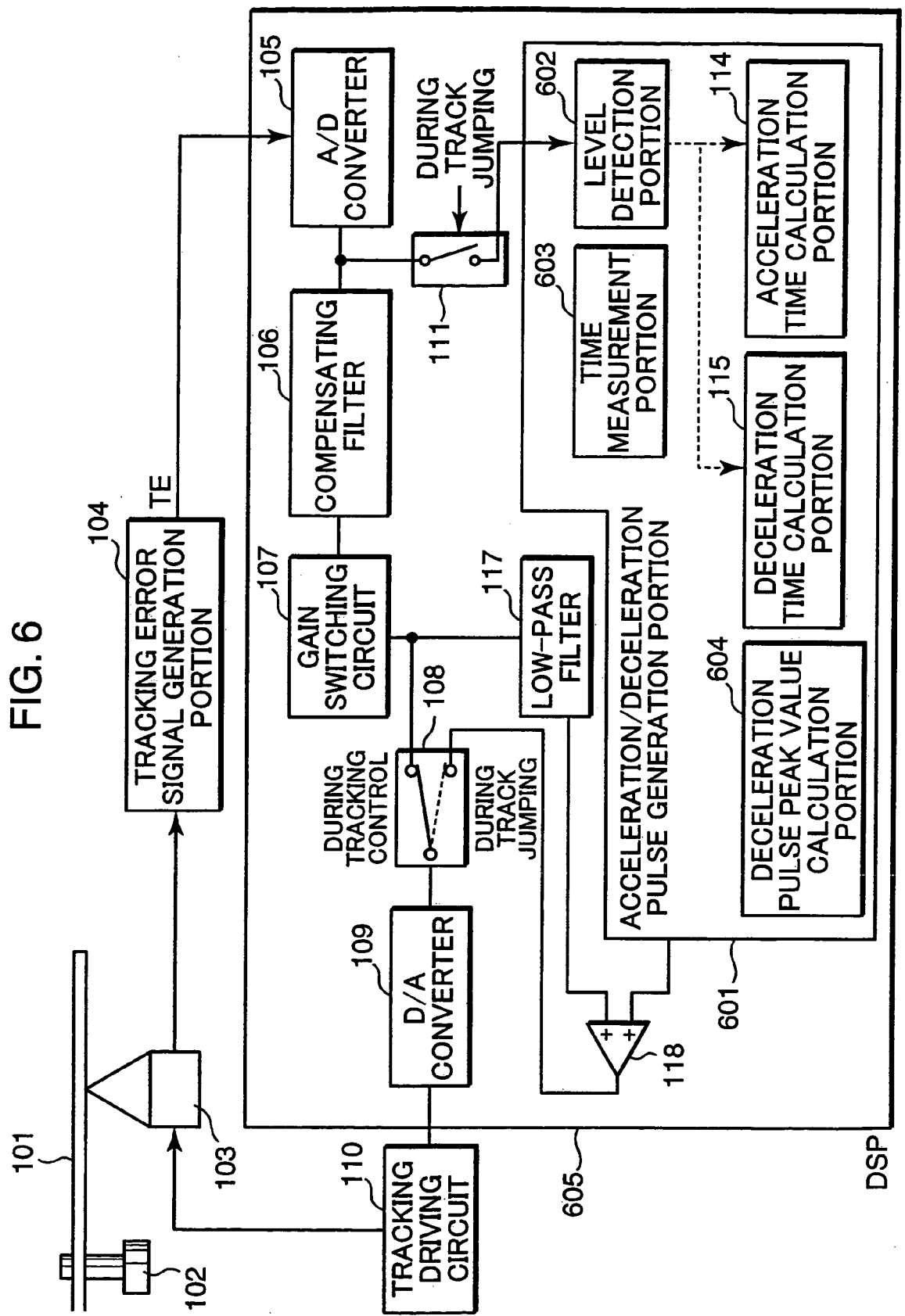
FIG. 6 is a block diagram showing the configuration of an optical disc device of a third embodiment of this invention.

Next, the optical disc device of a third embodiment of the invention is explained. As shown in FIG. 6, the optical disc device of this embodiment can be realized by providing a deceleration pulse peak value calculation portion 604 within the acceleration/deceleration pulse generation portion 112 (601), and modifying the processing of the level detection portion 113 (602) and time measurement portion 116 (603), in the optical disc device shown in FIG. 1. Here portions corresponding to the first embodiment are assigned the same symbols, and explanations are omitted.

Below, track jumping processing in this embodiment is explained in detail, referring to the waveform diagram of FIG. 7 and the flowchart of FIG. 8 in addition to the block diagram of FIG. 6.

Figure 7:
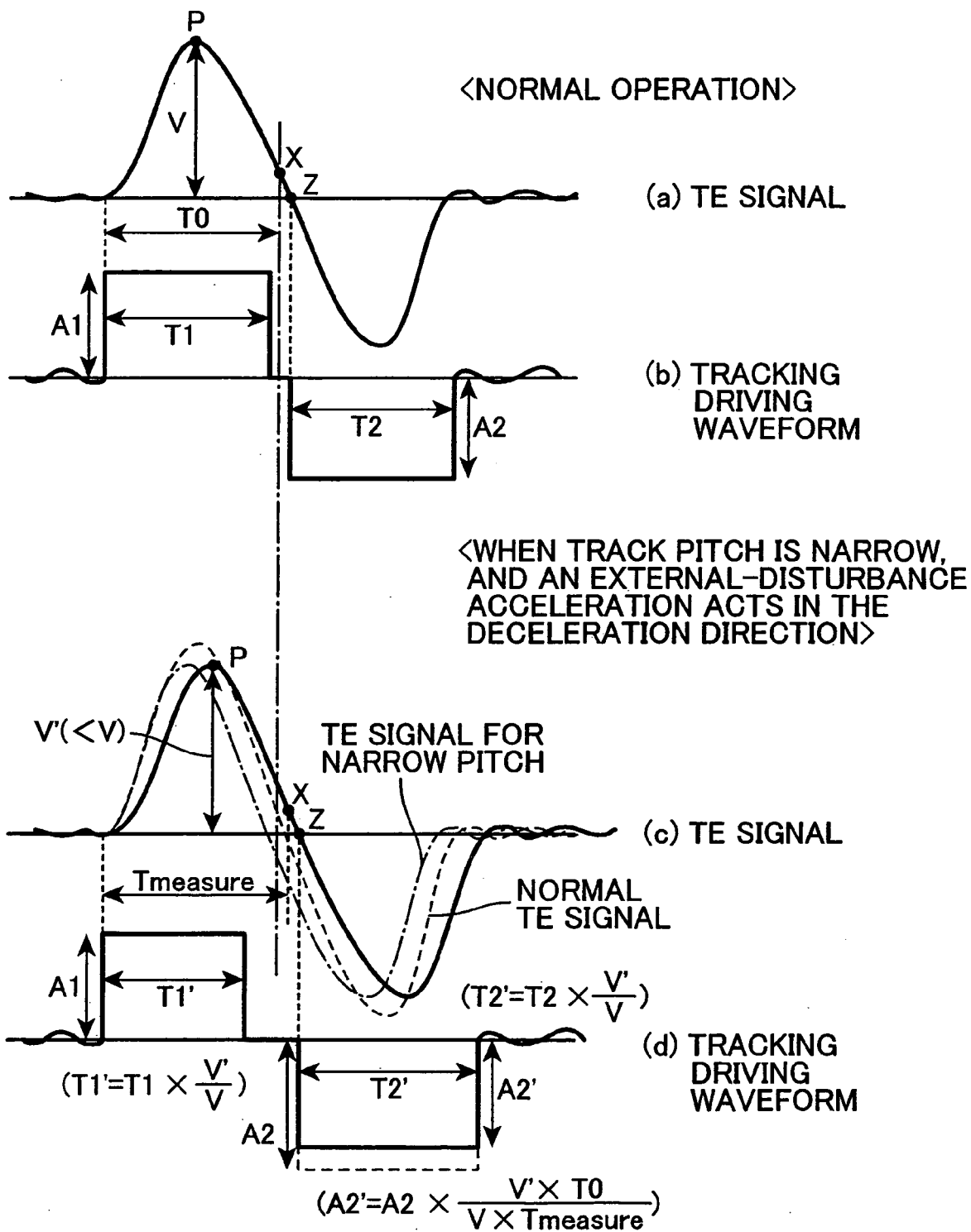
FIG. 7 is a timing chart showing the tracking error signal and tracking driving waveform of the track jumping method of the optical disc device shown in FIG. 6.

FIG. 7 is a waveform diagram during track jumping toward an inner circumference; in FIG. 7, (a) is a normal TE signal, and (b) is a normal tracking driving waveform. Further, (c) and (d) are a TE signal and tracking driving waveform when the track pitch is narrow and when external disturbances, caused by vibrations to the device, partial eccentricity of the optical disc 101 and similar, act in the deceleration direction. During track jumping toward an outer circumference, the polarities of the TE signal and tracking driving waveforms are simply inverted, and other respects are the same as for track jumping toward an inner circumference; hence the waveforms and a detailed explanation are omitted.

In this embodiment, as explained in detail below, when the maximum TE signal amplitude during acceleration is measured and the track pitch is judged to be broad or narrow, the acceleration/deceleration signal application time is modified. Further, the movement time from the initiation of acceleration until a prescribed position is reached is measured, and if it is judged that the movement speed has become fast or slow, the deceleration pulse peak value is modified.

Figure 8:
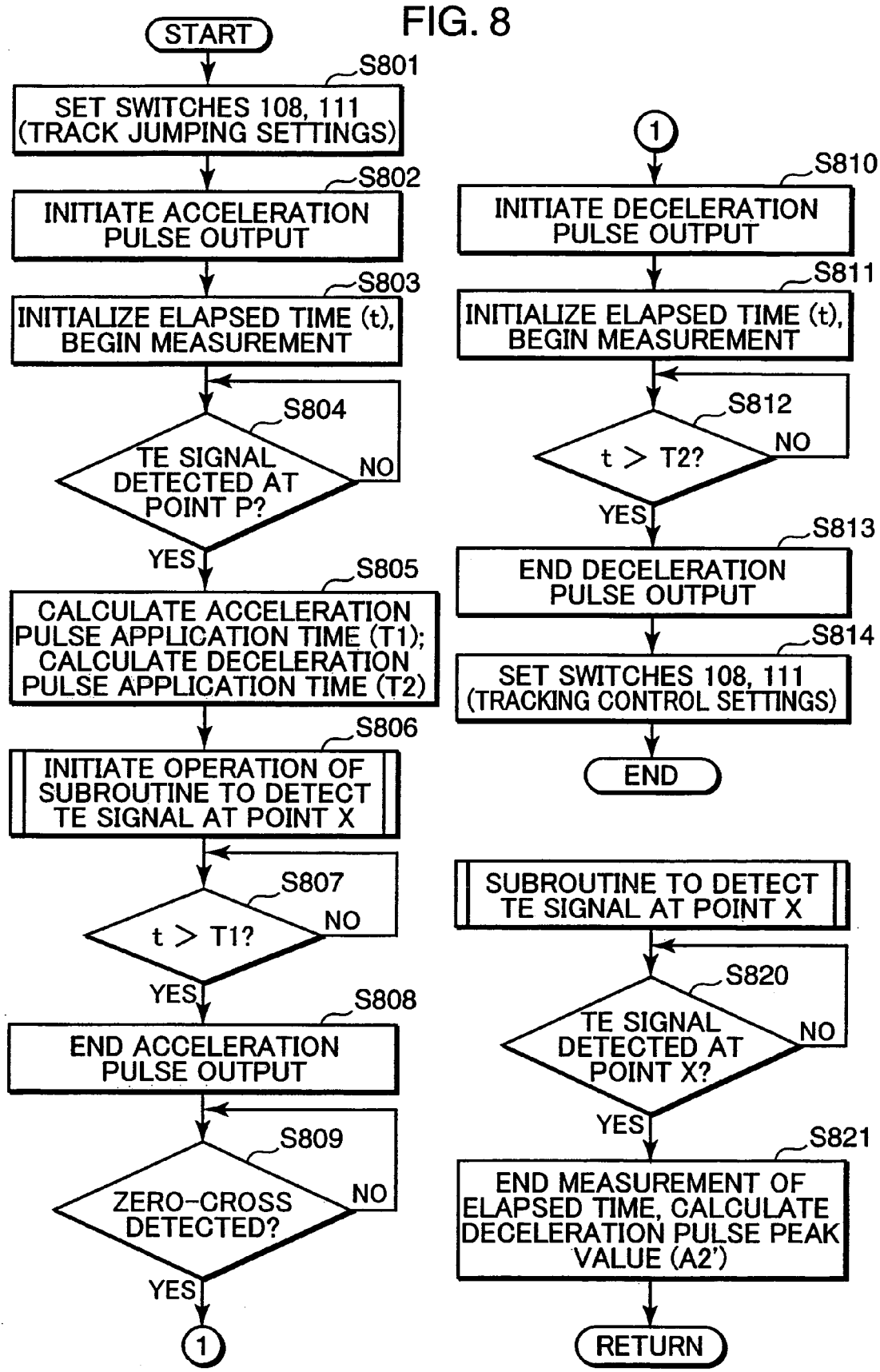
FIG. 8 is a flowchart which explains track jumping processing in the optical disc device shown in FIG. 6.

Track jumping processing is explained using the flowchart of FIG. 8. First, in step S801 the switch 108 is set to the position for track jumping indicated by the dashed line, and the switch 111 is set to the on position. Then in step S802 output of the acceleration pulse (with prescribed peak value A1) generated by the acceleration/deceleration pulse generation portion 601 is begun, and by this means movement of the optical head 103 toward an inner circumference of the optical disc 101 is begun; this is accompanied by the appearance of a sinusoidal TE signal.

Together with the initiation of acceleration pulse output, in step S803 the time measurement portion 603 initializes the elapsed time (t), and then begins measurement. Next, in step S804 the level detection portion 602 detects the passage of the TE signal through point P in FIG. 7, and measures the TE signal amplitude V' at this time. Then, in step S805 the acceleration time calculation portion 114 calculates the acceleration pulse application time T1' using the following eq. (6), and the deceleration time calculation portion 115 calculates the deceleration pulse application time T2' using the following eq. (7) according to the measured maximum TE signal amplitude during acceleration.

$$\text{Acceleration pulse application time } T1'=T1\times(V'/V) \quad (6)$$

$$\text{Deceleration pulse application time } T2'=T2\times(V'/V) \quad (7)$$

Here, similarly to the first embodiment, T1 is the reference acceleration pulse application time, and T2 is the reference deceleration pulse application time.

Next, in step S806 operation of a subroutine is begun to detect the passage of the TE signal through point X in FIG. 7. In this subroutine, in step S820 the fact that the TE signal has reached a prescribed level (for example, 1/10 of the maximum amplitude during acceleration, point X in FIG. 7) is detected, and in step S821 measurement of the movement time (Tmeasure) from the initiation of acceleration until point X is reached ends; based on this measured movement time, the deceleration pulse peak value calculation portion 604 calculates the peak value A2' of the deceleration pulse using the following eq. (8).

$$\text{Deceleration pulse peak value } A2'=A2\times(V'/V\times T0)/T\text{measure} \quad (8)$$

Here T0 is the reference movement time normally elapsing from the start of acceleration until a prescribed position (point X) is reached. When there is scattering in the track pitch, the time until point X is reached is (V'/V×T0). When, according to the measured time (Tmeasure), the movement speed is fast (Tmeasure<(V'/V×T0)), the peak value of the deceleration pulse is made higher, and when the movement speed is slow the deceleration pulse peak value is made lower.

Then in the main routine, in steps S807 and S808 the time measurement portion 603 detects that the elapsed time is the time calculated using eq. (6), and after detection the acceleration/deceleration pulse generation portion 601 ends output of the acceleration pulse. Next, in step S809 processing remains in a wait state until the TE signal zero-cross point (point Z in FIG. 7) is detected.

After detection of the TE signal zero-cross point, in step S810 output of a deceleration pulse with the peak value calculated using eq. (8) is initiated, and from step S811 to step S813 the deceleration pulse is output for the application time calculated using eq. (7). Then, in step S814 the switch 108 is set to the tracking control (recording/reproduction mode) position indicated by the solid line, the switch 111 is set to the off position, and by this means track jumping to the adjacent track in the inner direction is ended and tracking control is resumed.

As explained above, rather than performing acceleration/deceleration for a fixed length of time, by changing the acceleration/deceleration time according to the TE signal amplitude at the time of detection of point P, variations in the position of the optical head 103 at the end of deceleration arising from scattering in the track pitch can be absorbed, and the positional relationship can be held constant. Further, by modifying the deceleration pulse peak value according to the movement time from the start of acceleration until a prescribed position (point X) is reached, velocity fluctuations of the optical head 103 near the zero-cross point (point Z) can be absorbed and the position and movement velocity of the optical head 103 at the end of deceleration can be held constant even when external disturbances cause changes in the movement velocity of the optical head 103. By this means, stable track jumping can be realized with respect to scattering in the track pitch of the optical disc 101 even when there are external disturbances caused by vibration of the device, partial eccentricity of the optical disc 101, and similar.

Calculations to realize the tracking control means and calculations to realize the track jumping means are executed in the DSP 605 by a microcomputer program; the two are executed exclusively during tracking control and during track jumping by operation of the switch 108.

In this embodiment, the acceleration/deceleration time is modified according to the maximum TE signal amplitude during acceleration; however, similar advantageous results can be obtained through a configuration similar to the second embodiment in which the deceleration time is modified according to the maximum TE signal amplitude during deceleration.

Similarly to the first embodiment, due to fluctuations in the TE amplitude caused by track pitch scattering, the tracking control loop characteristics fluctuate immediately after the end of track jumping (when tracking control is resumed), so that by changing the setting of the gain switching circuit 107 for a fixed length of time after the resumption of tracking control according to the ratio of the measured amplitude to the reference amplitude calculated during acceleration, still more stable track jumping can be realized.

Fourth Embodiment

Figure 9:
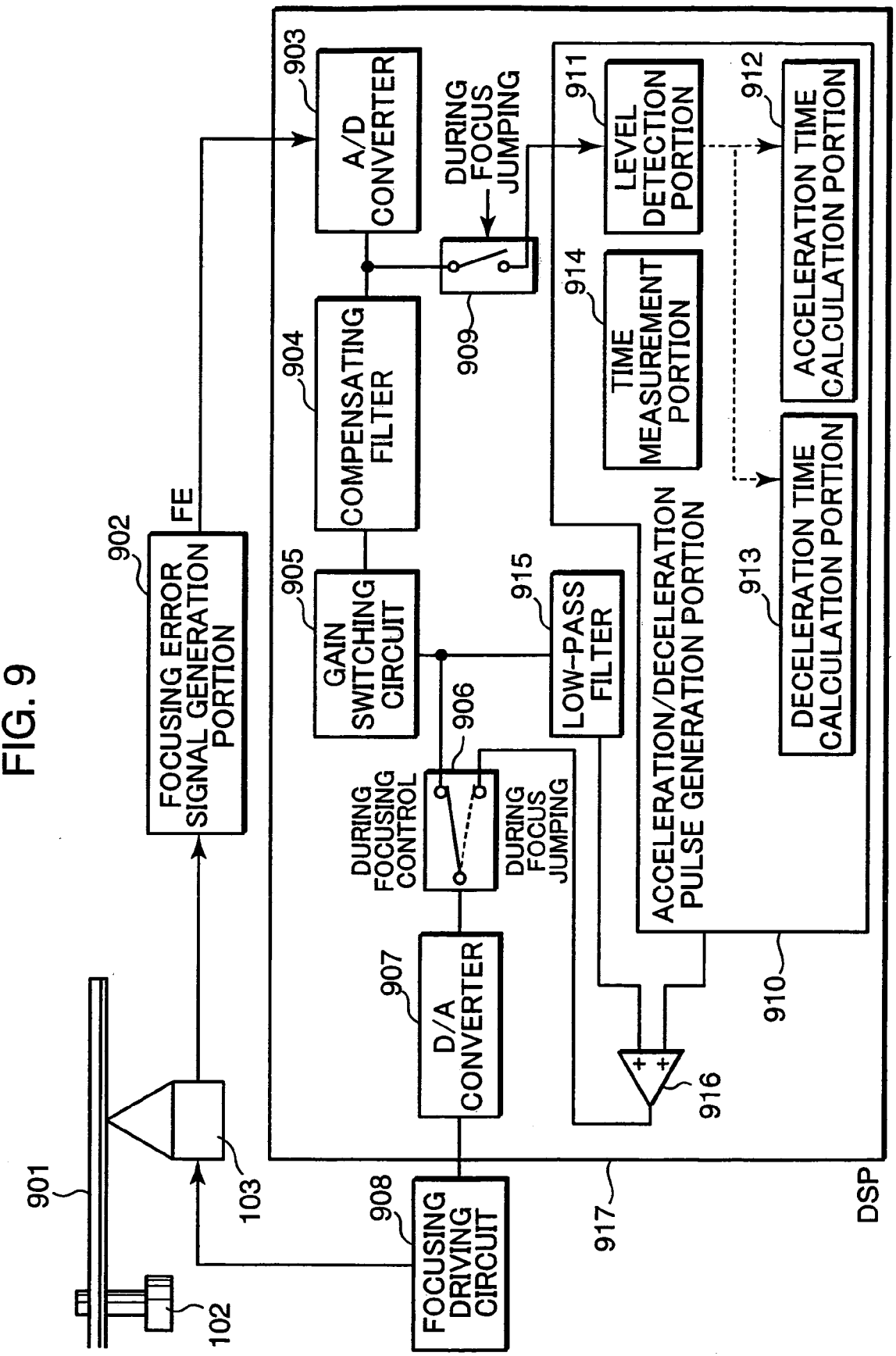
FIG. 9 is a block diagram showing the configuration of an optical disc device of a fourth embodiment of this invention.

Next, the optical disc device of a fourth embodiment of the invention is explained. FIG. 9 is a block diagram showing the configuration of the optical disc device of this embodiment. The optical disc device of FIG. 9 applies the track jumping method in the optical disc device of the first embodiment to a focus jumping method, which moves the focal spot from a certain data surface, in an optical disc 901 having a plurality of data surfaces, to another adjacent data surface. Portions corresponding to the first embodiment are assigned the same symbols, and explanations are omitted. In this embodiment, explanations assume an optical disc 901 having two data surfaces (the L0 layer and L1 layer); but this invention can similarly be applied to optical discs having three or more data surfaces.

One of the light beams divided into two directions by the dividing mirror (not shown) within the optical head 103 is input, as in the first embodiment, to the tracking control device (not shown), and tracking control and track jumping control are performed. The other light beam is input to a focusing control device via a photodetector with a two-segment structure in the optical head 103. The focusing control device comprises a focusing error signal generation portion 902, DSP (digital signal processor) 917, focusing driving circuit 908, and focusing actuator (not shown).

In the focusing error signal generation portion 902, the signals output from the two-segment photodetector are input to a differential amplifier. The signal output from this differential amplifier becomes the FE (focusing error) signal which is a signal indicating the shift in position between the light beam focal spot and the optical disc 901, and is input to the DSP 917.

Switches 906 and 909 are provided in the DSP 917. When focusing control must be performed, the switch 906 is set to the position indicated by the solid line, and the switch 909 is opened. When executing focus jumping to an adjacent data surface during seeking, the switch 906 is set to the position indicated by the dashed line, and the switch 909 is closed. Hence the switch 906 performs the operations of opening and closing the focusing control loop and of switching the driving signal applied to the focusing actuator during focusing control and during focus jumping.

Next, focusing control is explained. The FE signal input to the DSP 917 is converted from an analog signal to a digital signal by the A/D converter 903, and is input to the compensating filter 904. The compensating filter 904 is a digital filter comprising an adder, a multiplier, and a delay element, and compensates the phase of the focusing control system. An FE signal the phase of which has been compensated in the compensating filter 904 is input to the switch 906 via the gain switching circuit 905 which switches the loop gain of the focusing control system. The switch 906 is set to the position indicated by the solid line during focusing control, so that an FE signal passing through the switch 906 is converted from a digital signal to an analog signal by the D/A converter 907 and is input to the focusing driving circuit 908. The focusing driving circuit 908 performs appropriate current amplification and level conversion of the signal output from the DSP 917 to drive the focusing actuator.

As explained above, the focusing control system comprises the focusing error signal generation portion 902, A/D converter 903, compensating filter 904, gain switching circuit 905, D/A converter 907, focusing driving circuit 908, and focusing actuator; the focusing actuator is driven such that the light beam is always in a prescribed convergence state on the optical disc 901, to effect focusing control.

Figure 10:
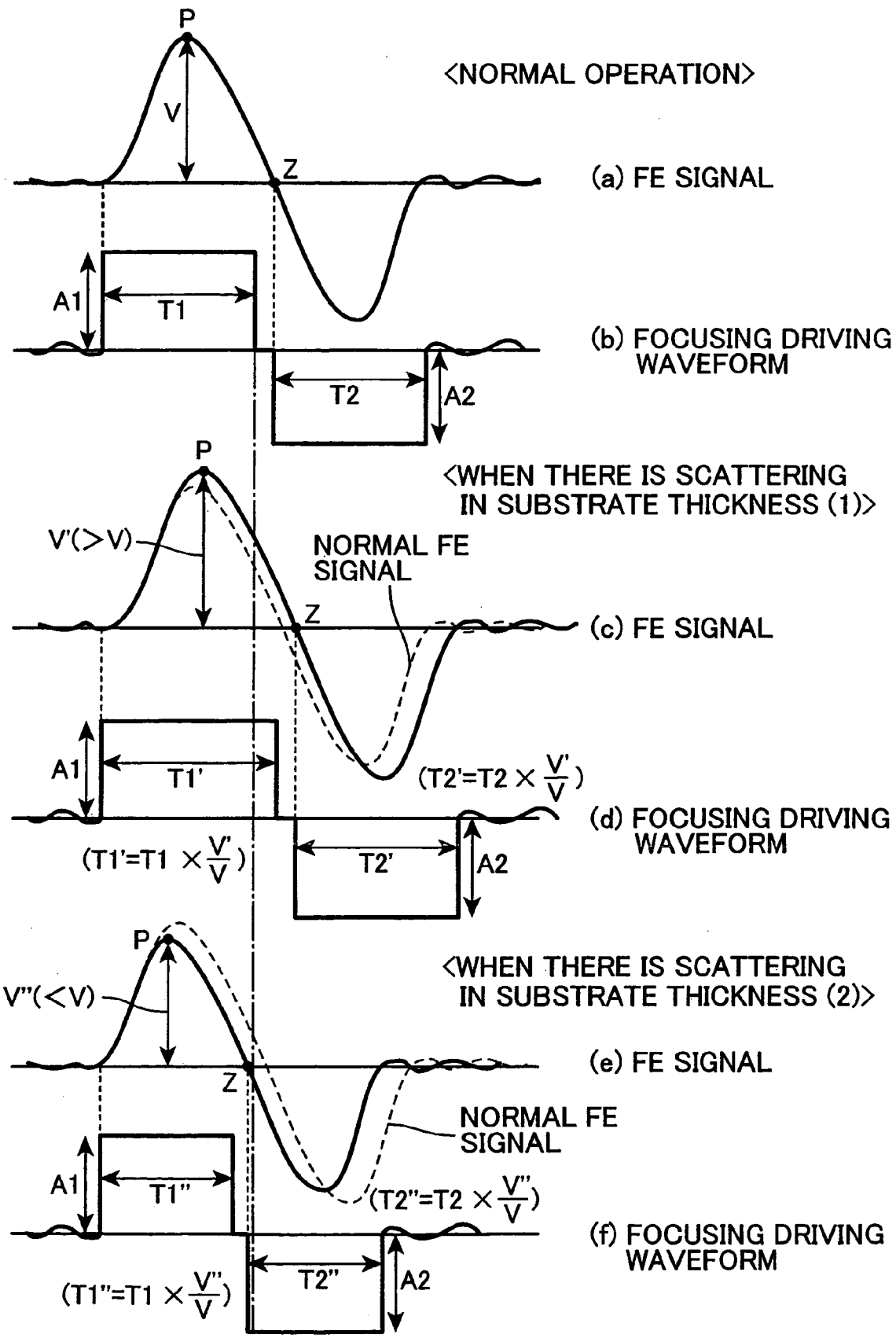
FIG. 10 is a timing chart showing the focusing error signal and focusing driving waveform of the focus jumping method of the optical disc device shown in FIG. 9.
Figure 11:
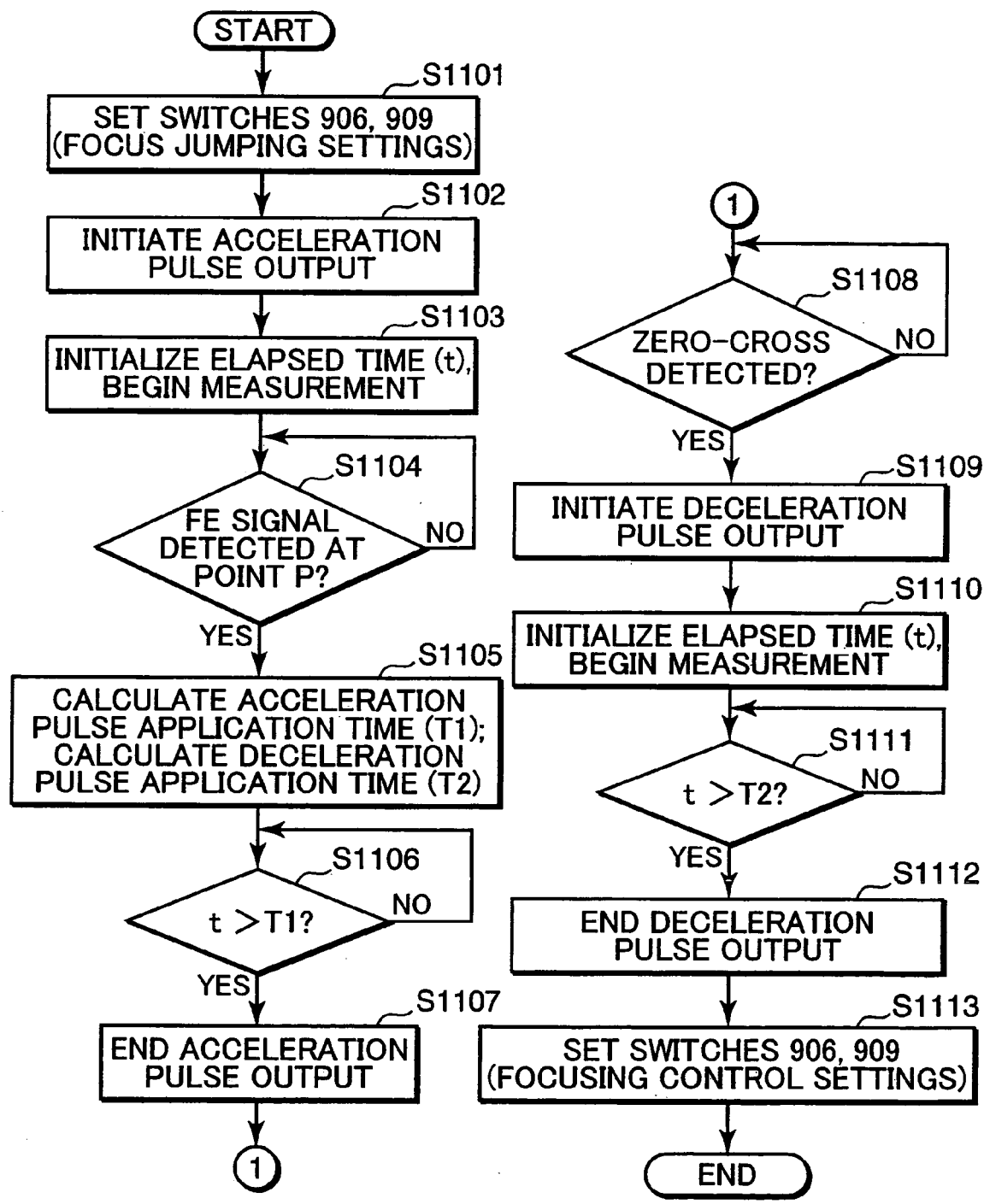
FIG. 11 is a flowchart which explains focus jumping processing in the optical disc device shown in FIG. 9.

Next, focus jumping processing in this embodiment is explained in detail, referring to the waveform diagram of FIG. 10 and the flowchart of FIG. 11 in addition to the block diagram of FIG. 9.

FIG. 10 is a waveform diagram for focus jumping from layer L0 to layer L1; in FIG. 10, (a) is a normal FE signal, and (b) is a normal focusing driving waveform. Also, (c) and (d), and (e) and (f) are FE signal and focusing driving waveforms when there is the effect of aberrations arising from scattering in the thickness of the substrate of the optical disc 901. During focus jumping from the L1 layer to the L0 layer, the polarities of the FE signal and focusing driving waveforms are simply inverted, and other respects are the same as for focus jumping from the L0 layer to the L1 layer; hence the waveforms and a detailed explanation are omitted.

During focus jumping, the acceleration/deceleration pulse generation portion 910 generates an acceleration pulse or a deceleration pulse (acceleration/deceleration pulse signal), and the adder 916 adds the acceleration/deceleration pulse signal and the output of the low-pass filter 915. The added signal passes through the switch 906, D/A converter 907 and focusing driving circuit 908 and is applied to the focusing actuator. The acceleration/deceleration pulse generation portion 910 comprises a level detection portion 911 which measures the amplitude of the FE signal, a time measurement portion 914 which measures the elapsed time, and an acceleration time calculation portion 912 and deceleration time calculation portion 913 which calculate the time of application of an acceleration pulse or deceleration pulse according to the measurement result of the time measurement portion 914.

The switch 909 is set to the off position during focusing control, but is set to the on position during focus jumping. Hence an FE signal which is converted from an analog signal to a digital signal in the A/D converter within the DSP 917 is input to the level detection portion 911. After the gain is set to a prescribed loop gain by the gain switching circuit 905, the FE signal is passed through the low-pass filter 915. The signal from the low-pass filter 915 is added to the acceleration/deceleration pulse signal in the adder 916, and the focusing actuator is driven by the addition signal thus obtained.

At this time, the cutoff frequency of the low-pass filter 915 is set low enough to enable sufficient passage of the optical disc run-out component, so that by adding the low-frequency component of the FE signal (run-out component) to the acceleration/deceleration pulse signal to drive the focusing actuator, instability of focus jumping due to optical disc run-out can be suppressed. As explained below, the maximum FE signal amplitude during acceleration is measured, and when it is judged that there is scattering in the substrate thickness, the time of application of the acceleration/deceleration signal is modified.

Focus jumping processing is explained using the flowchart of FIG. 11. First in step S1101, the switch 906 is set to the focus jumping position indicated by the dashed line, and the switch 909 is set to the on position. Then in step S1102 output of an acceleration pulse (with prescribed peak value A1) generated by the acceleration/deceleration pulse generation portion 910 is initiated, to initiate movement of the optical head 103 from the L0 layer toward the L1 layer of the optical disc 901, accompanied by the appearance of a sinusoidal FE signal. The method for setting the acceleration pulse peak value A1 is described below.

Together with initiation of the acceleration pulse output, in step S1103 the time measurement portion 914 initializes the elapsed time (t) and begins measurement. Then in step S1104, the level detection portion 911 detects the passage of the FE signal through the point P in FIG. 10, and the FE signal amplitude (V' or V") at this time is measured. Next, in step S1105 the acceleration time calculation portion 912 calculates the acceleration pulse application time T1' (or T1") using the following eq. (9), and the deceleration time calculation portion 913 calculates the deceleration pulse application time T2' (or T2") using the following eq. (10) based on the maximum value of the FE signal measured during acceleration.

$$\text{Acceleration pulse application time } T1' \text{ (or } T1'') = T1 \times (V' \text{ (or } V'')/V) \quad (9)$$

$$\text{Deceleration pulse application time } T2' \text{ (or } T2'') = T2 \times (V' \text{ (or } V'')/V) \quad (10)$$

Here T1 is the reference acceleration pulse application time, and T2 is the reference deceleration pulse application time. The method for setting T1 and T2 is described below.

Next, in steps S1106 and S1107 the time measurement portion 914 detects that the elapsed time has become the time calculated using eq. (9), and after detection, the acceleration/deceleration pulse generation portion 910 ends output of the acceleration pulse. Then, in step S1108 processing remains in a wait state until the FE signal zero-cross point (point Z in FIG. 10) is detected. Here detection of the zero-cross point is performed by detecting the point of intersection of the FE signal passing through the gain switching circuit 905, and the output signal of the low-pass filter 915.

After the FE signal zero-cross point is detected, in step S1109 output of the deceleration pulse (with prescribed peak value A2) is begun, and from step S1110 to S1112 the deceleration pulse is output over the application time calculated using eq. (10). The method for setting A2 is described below.

Then, in step S1113 the switch 906 is set to the focusing control position indicated by the solid line and the switch 909 is set to the off position; by this means, focus jumping to the adjacent data surface (from layer L0 to layer L1) is ended, and focusing control is resumed.

Next, the method of setting the acceleration pulse peak value A1, deceleration pulse peak value A2, reference acceleration pulse application time T1, and reference deceleration pulse application time T2 is explained. A1, A2 and T1, T2 are set, according to the sensitivity of the focusing actuator, so as to enable stable focus jumping when there is no scattering in the substrate thickness of the optical disc 901. Here the peak values A1 and A2 are set such that even for discs with run-out, the signal passing through the adder 916 does not reach saturation. Also, values are set such that eq. (11) below obtains, in order that the energy applied to the focusing actuator during acceleration and during deceleration is equal.

$$A1 \times T1 = A2 \times T2 \quad (11)$$

As explained above, similarly to the track jumping method, by modifying the acceleration/deceleration time according to the FE signal amplitude at the time of detection of point P rather than performing acceleration/deceleration for a fixed length of time, fluctuations in the position of the optical head 103 at the end of deceleration due to scattering in the substrate thickness can be absorbed, and the positional relationship can be held constant. By this means, focus jumping which is stable with respect to scattering in the substrate thickness of the optical disc 9101 can be realized.

Calculations to realize the focusing control means and calculations to realize the focus jumping means are executed in the DSP 917 by a microcomputer program; the two are executed exclusively during focusing control and during focus jumping by operation of the switch 906.

Also, due to fluctuations in the FE amplitude caused by scattering in the substrate thickness, the focusing control loop characteristics fluctuate immediately after the end of focus jumping (when focusing control is resumed), so that by changing the setting of the gain switching circuit 905 according to the ratio of the measured amplitude to the reference amplitude calculated for acceleration, by for example increasing the gain by 1 dB over the normal value for a 2 ms interval after focus jumping, more stable focus jumping can be realized.

Fifth Embodiment

Next, the optical disc device of a fifth embodiment of this invention is explained. The optical disc device of this embodiment is realized by modifying the processing of the level detection portion 911 and deceleration time calculation portion 913 of the optical disc device shown in FIG. 9; the basic configuration is similar to that of the optical disc device of FIG. 9.

Below, focus jumping in this embodiment is explained in detail, referring to the waveform diagram of FIG. 12 and flowchart of FIG. 13 in addition to the block diagram of FIG. 9.

Figure 12:
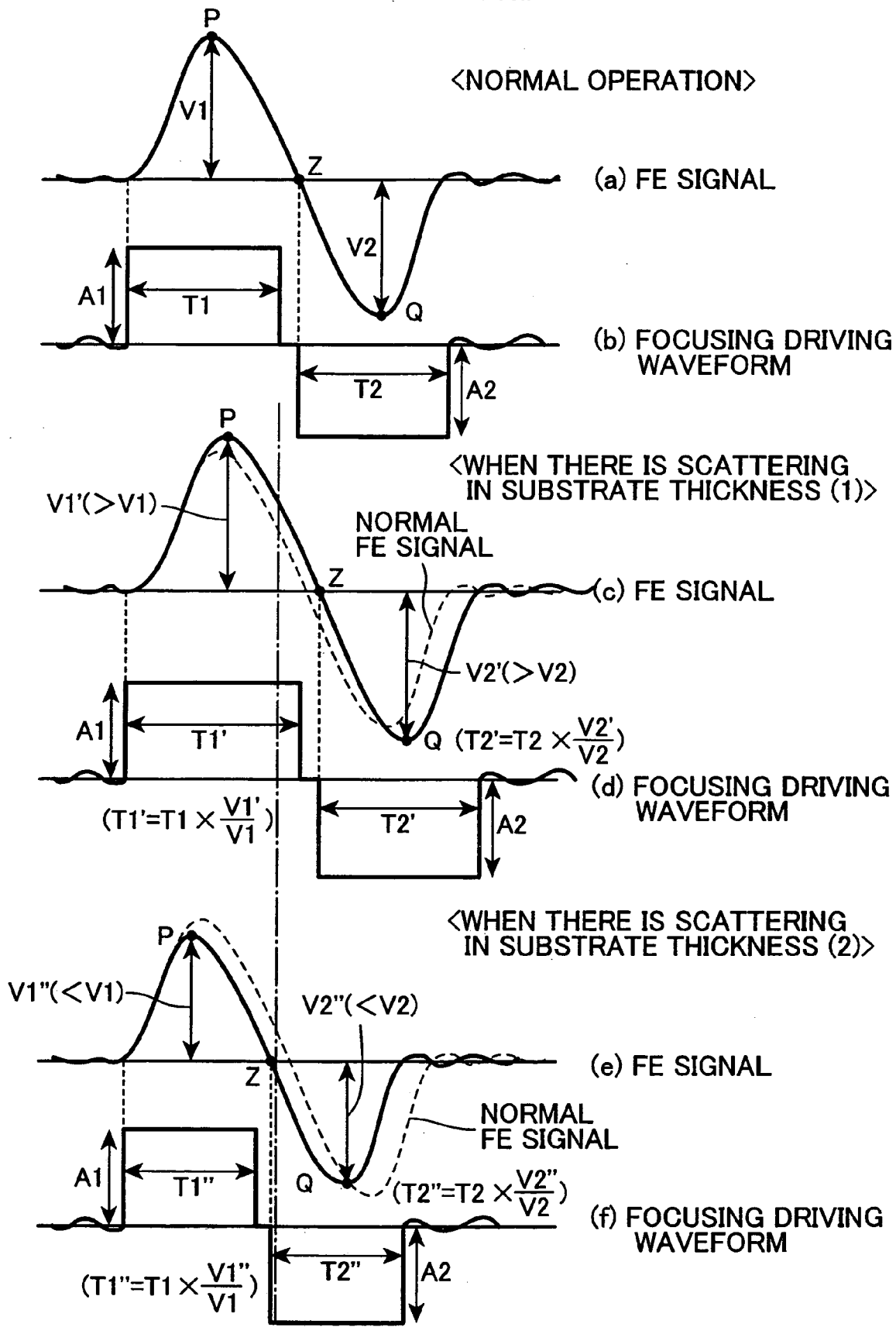
FIG. 12 is a timing chart showing the focusing error signal and focusing driving waveform of the focus jumping method of the optical disc device of a fifth embodiment of this invention.

FIG. 12 is a waveform diagram of focus jumping from layer L0 to layer L1; in FIG. 12, (a) is a normal FE signal, and (b) is a normal focusing driving waveform. Also, (c) and (d), and (e) and (f) are the FE signal and focusing driving waveforms when there is the effect of aberrations arising from scattering in the thickness of the substrate of the optical disc 901. During focus jumping from the L1 layer to the L0 layer, the polarities of the FE signal and focusing driving waveforms are simply inverted, and other respects are the same as for focus jumping from the L0 layer to the L1 layer; hence the waveforms and a detailed explanation are omitted.

In this embodiment, as explained in detail below, the maximum FE signal amplitude during acceleration is measured, and when there is judged to be scattering in the substrate thickness the acceleration signal application time is modified; also, the maximum FE signal amplitude during deceleration is measured, and when there is judged to be scattering in the substrate thickness the deceleration signal application time is modified.

Figure 13:
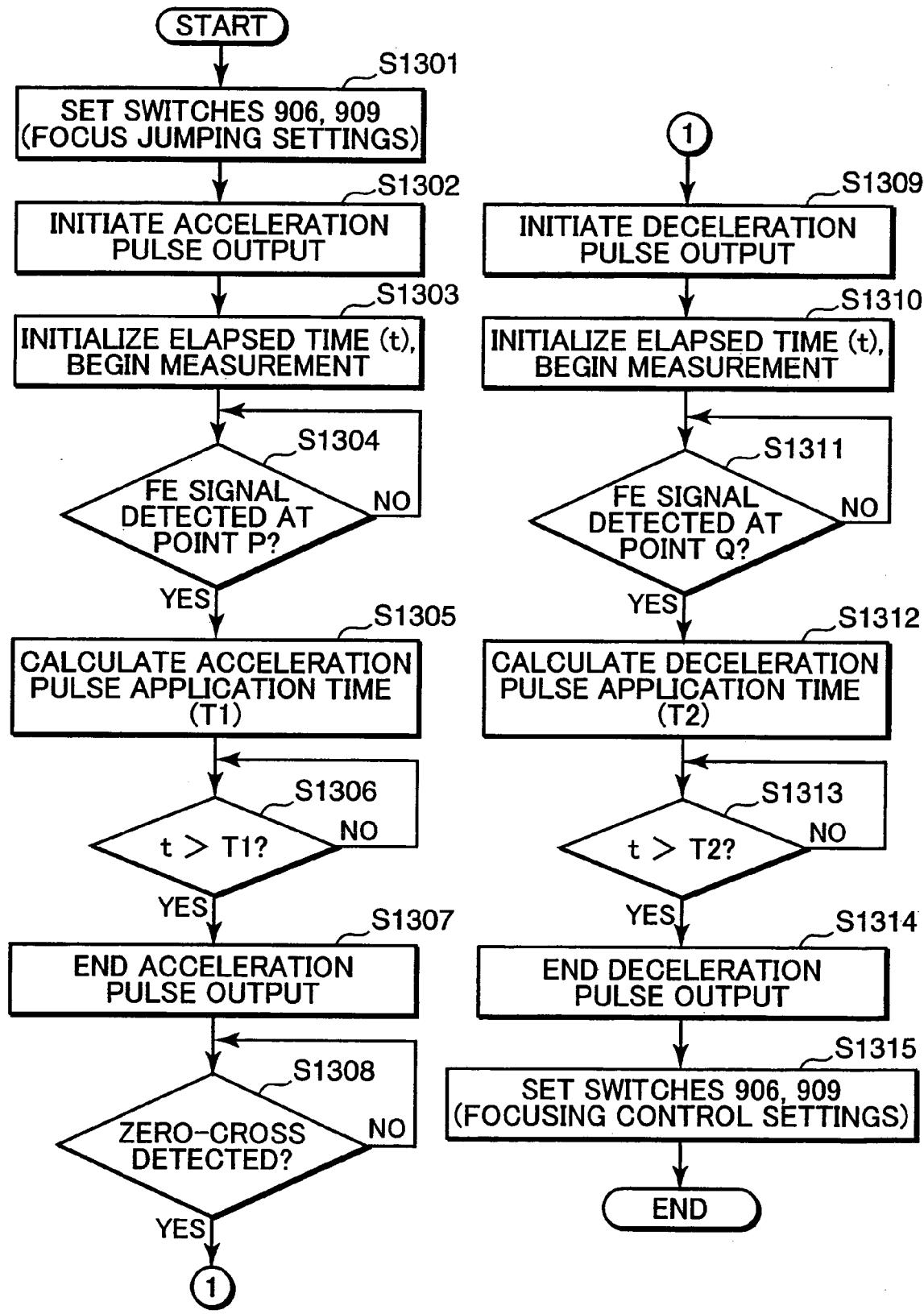
FIG. 13 is a flowchart which explains focus jumping processing in the optical disc device of the fifth embodiment of this invention.

Focus jumping processing is explained using the flowchart of FIG. 13. First, in step S1301 the switch 906 is set to the focus jumping position indicated by the dashed line, and the switch 909 is set to the on position. Then in step S1302, by initiating output of an acceleration pulse (with prescribed peak value A1) generated by the acceleration/deceleration pulse generation portion 910, movement of the optical head 103 from layer L0 to layer L1 of the optical disc 901 is begun, accompanied by the appearance of a sinusoidal FE signal.

Together with initiation of the acceleration pulse output, in step S1303 the time measurement portion 914 initializes the elapsed time (t) and begins measurement. Then in step S1304, the level detection portion 911 detects the passage of the FE signal through the point P in FIG. 12, and the FE signal amplitude (V' or V") at this time is measured. Next, in step S1305 the acceleration time calculation portion 912 calculates the acceleration pulse application time T1' (or T1") using the following eq. (12), based on the maximum value of the FE signal measured during acceleration.

$$\text{Acceleration pulse application time } T1' \text{ (or } T1'') = T1 \times (V1' \text{ (or } V1'')/V1) \quad (12)$$

Here, similarly to the fourth embodiment, T1 is the reference acceleration pulse application time.

Next, in steps S1306 and S1307 the time measurement portion 914 detects that the elapsed time has become the time calculated using eq. (12), and after detection, the acceleration/deceleration pulse generation portion 910 ends output of the acceleration pulse. Then, in step S1308 processing remains in a wait state until the FE signal zero-cross point (point Z in FIG. 12) is detected.

After the FE signal zero-cross point is detected, in step S1309 output of the deceleration pulse (with prescribed peak value A2) is b gun, and in step S1310 the time measurement portion 914 reinitializes the elapsed time (t) and then begins measurement. Next, in step S1311 the level detection portion 911 detects that the FE signal has passed through point Q in FIG. 12, and the FE signal amplitude at that time (V2' or V2") is measured. Then in step S1312 the deceleration time calculation portion 913 calculates the deceleration pulse application time T2' (or T2") using eq. (13) below, according to the maximum FE signal amplitude measured during deceleration.

$$\text{Deceleration pulse application time } T2' \text{ (or } T2'') = T2 \times (V2' \text{ (or } V2'')/V2) \quad (13)$$

Here, similarly to the fourth embodiment, T2 is the reference deceleration pulse application time.

Then, in steps S1313 and S1314 the time measurement portion 914 detects that the elapsed time is the time calculated using eq. (13), and after detection the acceleration/deceleration pulse generation portion 910 ends output of the deceleration pulse. Then in step S1315 the switch 906 is set in the focusing control position indicated by the solid line, and the switch 909 is set in the off position, to end focus jumping to the adjacent data surface (from layer L0 to layer L1) and resume focus control.

As explained above, similarly to above-described track jumping methods, by modifying the acceleration time according to the FE signal amplitude at the time of detection of point P and modifying the deceleration time according to the FE signal amplitude at the time of detection of point Q rather than performing acceleration/deceleration for a fixed length of time, fluctuations in the position of the optical head 103 at the end of deceleration caused by scattering in the substrate thickness are absorbed, and the positional relationship can be held constant. By this means, stable focus jumping with respect to scattering in the substrate thickness of the optical disc 901 can be realized.

Calculations to realize the focusing control means and calculations to realize the focus jumping means are executed in the DSP 917 by a microcomputer program; the two are executed exclusively during focusing control and during focus jumping by operation of the switch 906.

Also, similarly to the fourth embodiment, due to fluctuations in the FE amplitude caused by scattering in the substrate thickness, the focusing control loop characteristics fluctuate immediately after the end of focus jumping (when focusing control is resumed), so that by changing the setting of the gain switching circuit 905 for a fixed length of time after the resumption of focusing control according to the ratio of the measured amplitude to the reference amplitude calculated for deceleration, still more stable focus jumping can be realized.

Sixth Embodiment

Figure 14:
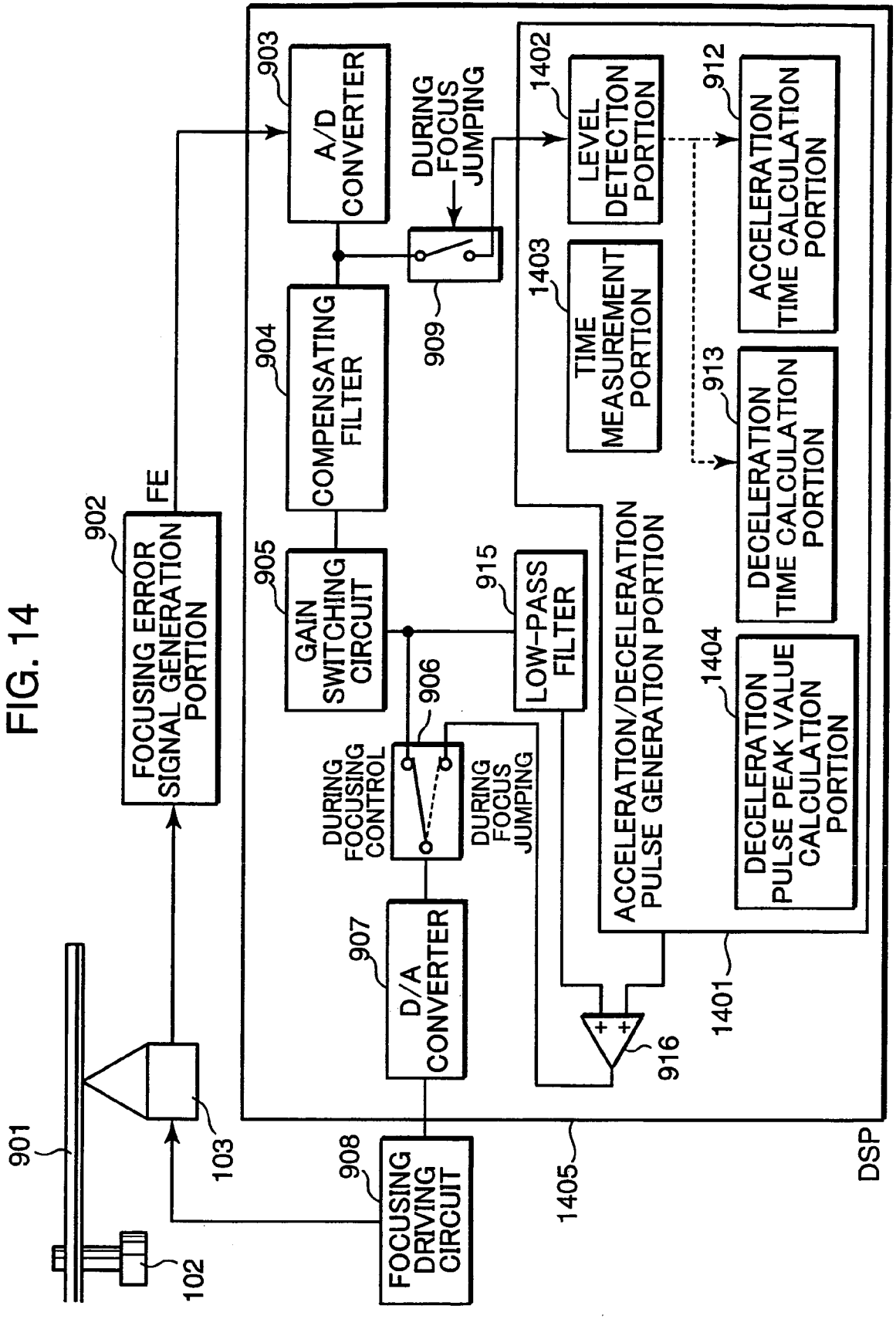
FIG. 14 is a block diagram showing the configuration of an optical disc device of a sixth embodiment of this invention.

Next, the optical disc device of a sixth embodiment of this invention is explained. As shown in FIG. 14, the optical disc device of this embodiment is realized by, in the optical disc device shown in FIG. 9, providing a deceleration pulse peak value calculation portion 1404 within the acceleration/deceleration pulse generation portion 910 (1401), and by modifying the processing of the level detection portion 911 (1402) and time calculation portion 914 (1403). Portions which correspond to the fourth embodiment are assigned the same symbols, and explanations are here omitted.

Below, focus jumping in this embodiment is explained in detail, referring to the waveform diagram of FIG. 15 and flowchart of FIG. 16 in addition to the block diagram of FIG. 14.

Figure 15:
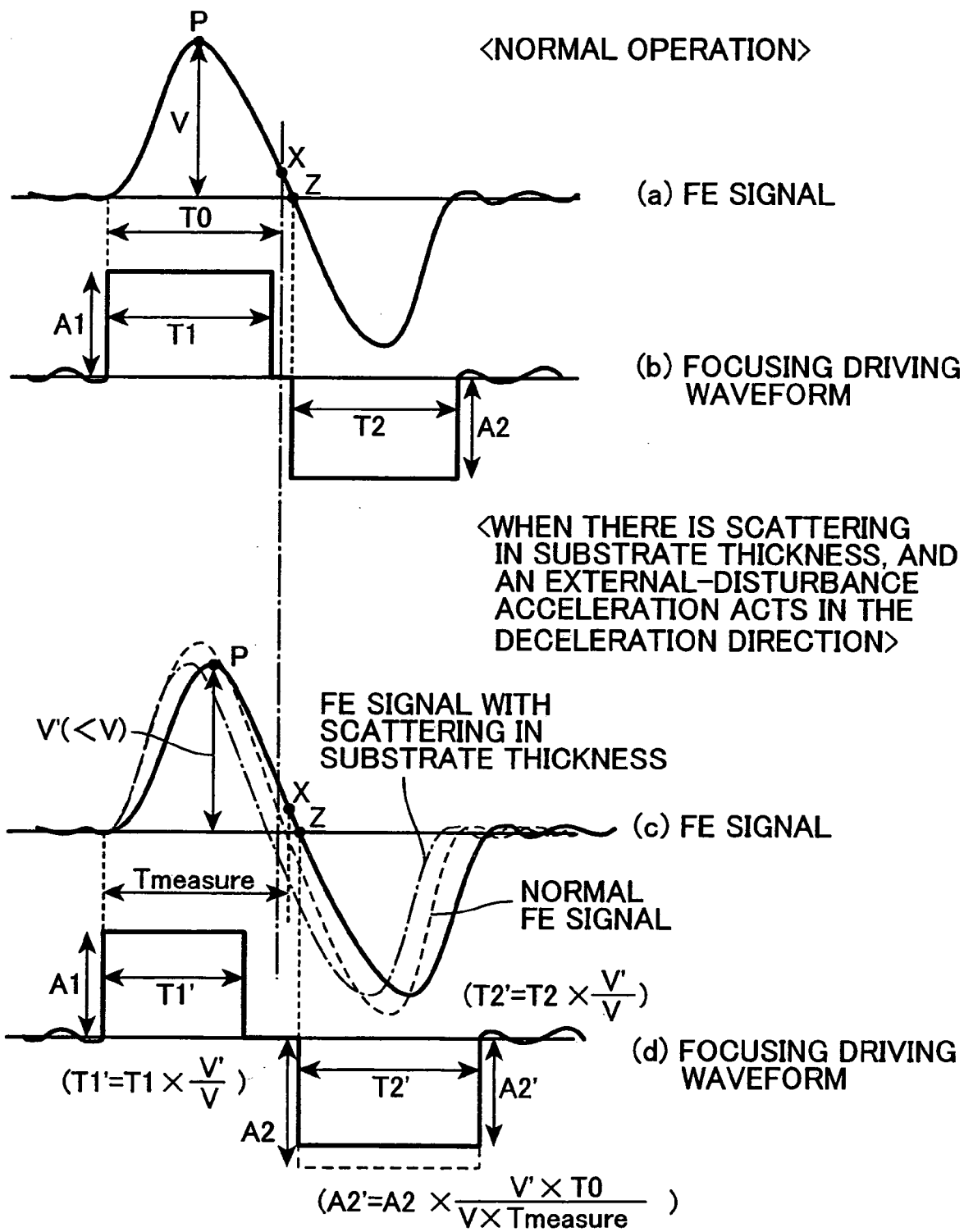
FIG. 15 is a timing chart showing the focusing error signal and focusing driving waveform of the focus jumping method of the optical disc device shown in FIG. 14; and, FIG. 16 is a flowchart which explains focus jumping processing in the optical disc device shown in FIG. 14.

FIG. 15 is a waveform diagram of focus jumping from layer L0 to layer L1; in FIG. 15, (a) is a normal FE-signal, and (b) is a normal focusing driving waveform. Also, (c) and (d) are the FE signal and focusing driving waveforms when there is the effect of aberrations arising from scattering in the thickness of the substrate of the optical disc 901, and in addition there are external disturbances due to vibrations of the device, partial run-out of the optical disc 901, and similar. During focus jumping from the L1 layer to the L0 layer, the polarities of the FE signal and focusing driving waveforms are simply inverted, and other respects are the same as for focus jumping from the L0 layer to the L1 layer; hence the waveforms and a detailed explanation are omitted.

In this embodiment, as explained in detail below, the maximum FE signal amplitude during acceleration is measured, and when there is judged to be scattering in the substrate thickness the acceleration/deceleration signal application time is modified. Also, the movement time from the initiation of acceleration until a prescribed position is reached is measured, and when the movement velocity is judged to be fast or slow, the peak value of the deceleration pulse is modified.

Focus jumping processing is explained using the flowchart of FIG. 16. First, in step S1601 the switch 906 is set to the focus jumping position indicated by the dashed line, and the switch 909 is set to the on position. Then in step S1602, by initiating output of an acceleration pulse (with prescribed peak value A1) generated by the acceleration/deceleration pulse generation portion 1401, movement of the optical head 103 from layer L0 to layer L1 of the optical disc 901 is begun, accompanied by the appearance of a sinusoidal FE signal.

Together with initiation of the acceleration pulse output, in step S1603 the time measurement portion 1403 initializes the elapsed time (t) and begins measurement. Then in step S1604, the level detection portion 1402 detects the passage of the FE signal through the point P in FIG. 15, and the FE signal amplitude V' at this time is measured. Next, in step S1605 the acceleration time calculation portion 912 calculates the acceleration pulse application time T1' using the following eq. (14), and the deceleration time calculation portion 913 calculates the deceleration pulse application time T2' using the following eq. (15) based on the maximum value of the FE signal measured during acceleration.

$$\text{Acceleration pulse application time } T1' = T1 \times (V'/V) \quad (14)$$

$$\text{Deceleration pulse application time } T2' = T2 \times (V'/V) \quad (15)$$

Here, similarly to the fourth embodiment, T1 is the reference acceleration pulse application time, and T2 is the reference deceleration pulse application time.

Next, in step S1606 the operation of a subroutine to detect the passage of the FE signal through point X in FIG. 15 is begun. In this subroutine, in step S1620 the fact that the FE signal has reached a prescribed level (for example, 1/10 of the maximum amplitude during acceleration, point X in FIG. 15) is detected, and in step S1621 measurement of the movement time (Tmeasure) from the initiation of acceleration until point X is reached ends; based on this measured movement time, the deceleration pulse peak value calculation portion 1404 calculates the peak value A2' of the deceleration pulse using the following eq. (16).

$$\text{Deceleration pulse peak value } A2' = A2 \times (V'/V \times T0)/T\text{measure} \quad (16)$$

Here T0 is the reference movement time normally elapsing from the start of acceleration until a prescribed position (point X) is reached. When there is scattering in the substrate thickness, the time until point X is reached is (V'/V×T0). When, according to the measured time (Tmeasure), the movement speed is fast (Tmeasure<(V'/V×T0)), the peak value of the deceleration pulse is made higher, and when the movement speed is slow the deceleration pulse peak value is made lower.

Then in the main routine, in steps S1607 and S1608 the time measurement portion 1403 detects that the elapsed time is the time calculated using eq. (14), and after detection the acceleration/deceleration pulse generation portion 1401 ends output of the acceleration pulse. Next, in step S1609 processing remains in a wait state until the FE signal zero-cross point (point Z in FIG. 15) is detected.

After detection of the FE signal zero-cross point, in step S1610 output of a deceleration pulse with the peak value calculated using eq. (16) is initiated, and from step S1611 to step S1613 the deceleration pulse is output for the application time calculated using eq. (15). Then, in step S1614 the switch 906 is set to the focusing control position indicated by the solid line, the switch 909 is set to the off position, and by this means focus jumping to the adjacent data surface (from layer L0 to layer L1) is ended and focusing control is resumed.

As explained above, similarly to track jumping methods, rather than performing acceleration/deceleration for a fixed length of time, by changing the acceleration/deceleration time according to the FE signal amplitude at the time of detection of point P, variations in the position of the optical head 103 at the end of deceleration arising from scattering in the substrate thickness can be absorbed, and the positional relationship can be held constant. Further, by modifying the deceleration pulse peak value according to the movement time from the start of acceleration until a prescribed position (point X) is reached, velocity fluctuations of the optical head 103 near the zero-cross point (point Z) can be absorbed and the position and movement velocity of the optical head 103 at the end of deceleration can be held constant even when external disturbances cause changes in the movement velocity of the optical head 103. By this means, stable focus jumping can be realized with respect to scattering in the substrate thickness of the optical disc 901 even when there are external disturbances caused by vibration of the device, partial run-out of the optical disc 901, and similar.

Calculations to realize the focusing control means and calculations to realize the focus jumping means are executed in the DSP 1405 by a microcomputer program; the two are executed exclusively during focusing control and during focus jumping by operation of the switch 906.

Also, in this embodiment the acceleration/deceleration time is modified according to the maximum FE signal amplitude during acceleration; but similarly to the fifth embodiment, similar advantageous results can also be obtained by modifying the deceleration time according to the maximum FE signal amplitude during deceleration.

Also, similarly to the fourth embodiment, due to fluctuations in the FE amplitude caused by scattering in the substrate thickness, the focusing control loop characteristics fluctuate immediately after the end of focus jumping (when focusing control is resumed), so that by changing the setting of the gain switching circuit 905 for a fixed length of time after the resumption of focusing control according to the ratio of the measured amplitude to the reference amplitude calculated for acceleration, still more stable focus jumping can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical disc device, comprising:
   movement means, which moves the focal spot of a light beam focused on an information carrier in a direction to traverse a track on the information carrier;
   detracking detection means, which generates a signal according to the positional relationship between the focal spot of the light beam and a track;
   tracking control means, which drives said movement means according to the signal output from said detracking detection means, and executes control such that the focal spot of the light beam scans on a track; and,
   track jumping means, which moves the focal spot of the light beam from a first track on the information carrier to an adjacent second track; and wherein
   said track jumping means comprises acceleration means which applies to said movement means an acceleration signal to accelerate the light beam, deceleration means which applies to said movement means a deceleration signal to decelerate the light beam which has been accelerated by said acceleration means, and amplitude measurement means which measures the amplitude of the signal output from said detracking detection means during operation of said acceleration means;
   said acceleration means modifies the length of time of the acceleration signal based on the amplitude measured by said amplitude measurement means; and,
   said deceleration means modifies the length of time of the deceleration signal based on the amplitude measured by said amplitude measurement means.

2. The optical disc device according to claim 1, wherein the acceleration signal output by said acceleration means comprises a pulse signal of prescribed peak value, and the time width of said pulse signal is set by multiplying the ratio of the amplitude measured by said amplitude measurement means to a reference amplitude with a prescribed reference acceleration time.

3. The optical disc device according to claim 1, wherein the deceleration signal output by said deceleration means comprises a pulse signal of prescribed peak value, and the time width of said pulse signal is set by multiplying the ratio of the amplitude measured by said amplitude measurement means to a reference amplitude with a prescribed reference deceleration time.

4. The optical disc device according to claim 1, wherein said tracking control means comprises gain switching means which modifies the gain intersection point of the control loop, and said tracking control means switches the setting of said gain switching means for a prescribed length of time after operation of the track jumping means according to the ratio of the amplitude measured by said amplitude measurement means to a reference amplitude.

5. An optical disc device, comprising:
movement means, which moves the focal spot of a light beam focused on an information carrier in a direction to traverse a track on the information carrier;
detracking detection means, which generates a signal according to the positional relationship between the focal spot of the light beam and a track;
tracking control means, which drives said movement means according to the signal output from said detracking detection means, and executes control such that the focal spot of the light beam scans on a track; and,
track jumping means, which moves the focal spot of the light beam from a first track on the information carrier to an adjacent second track; and wherein
said track jumping means comprises acceleration means which applies to said movement means an acceleration signal to accelerate the light beam, deceleration means which applies to said movement means a deceleration signal to decelerate the light beam which has been accelerated by said acceleration means, first amplitude measurement means which measures the amplitude of the signal output from said detracking detection means during operation of said acceleration means, and second amplitude measurement means which measures the amplitude of the signal output from said detracking detection means during operation of said deceleration means;
said acceleration means modifies the length of time of the acceleration signal based on the amplitude measured by said first amplitude measurement means; and,
said deceleration means modifies the length of time of the deceleration signal based on the amplitude measured by said second amplitude measurement means.

6. The optical disc device according to claim 5, wherein the acceleration signal output by said acceleration means comprises a pulse signal of prescribed peak value, and the time width of said pulse signal is set by multiplying the ratio of the amplitude measured by said first amplitude measurement means to a reference amplitude with a prescribed reference acceleration time.

7. The optical disc device according to claim 5, wherein the deceleration signal output by said deceleration means comprises a pulse signal of prescribed peak value, and the time width of said pulse signal is set by multiplying the ratio of the amplitude measured by said second amplitude measurement means to a reference amplitude with a prescribed reference deceleration time.

8. The optical disc device according to claim 5, wherein said tracking control means comprises gain switching means which modifies the gain intersection point of the control loop, and said tracking control means switches the setting of said gain switching means for a prescribed length of time after operation of the track jumping means according to the ratio of the amplitude measured by said second amplitude measurement means to a reference amplitude.

9. An optical disc device, comprising:
movement means, which moves the focal spot of a light beam focused on an information carrier in a direction to traverse a track on the information carrier;
detracking detection means, which generates a signal according to the positional relationship between the focal spot of the light beam and a track;
tracking control means, which drives said movement means according to the signal output from said detracking detection means, and executes control such that the focal spot of the light beam scans on a track; and,
track jumping means, which moves the focal spot of the light beam from a first track on the information carrier to an adjacent second track; and wherein
said track jumping means comprises acceleration means which applies to said movement means an acceleration signal to accelerate the light beam, deceleration means which applies to said movement means a deceleration signal to decelerate the light beam which has been accelerated by said acceleration means, amplitude measurement means which measures the amplitude of the signal output from said detracking detection means during operation of said acceleration means, and movement time measurement means which measures the length of time from the time of initiation of movement of the light beam by said track jumping means until a prescribed location between said first track and said second track is reached;
said acceleration means modifies the length of time of the acceleration signal based on the amplitude measured by said amplitude measurement means; and,
said deceleration means modifies the length of time and peak value of the deceleration signal based on the amplitude measured by said amplitude measurement means and on the time measured by said movement time measurement means.

10. The optical disc device according to claim 9, wherein the acceleration signal output by said acceleration means comprises a pulse signal of prescribed peak value, and the time width of said pulse signal is set by multiplying the ratio of the amplitude measured by said amplitude measurement means to a reference amplitude with a prescribed reference acceleration time.

11. The optical disc device according to claim 9, wherein the deceleration signal output by said deceleration means comprises a pulse signal, the time width of said pulse signal is set by multiplying the amplitude ratio of the amplitude measured by said amplitude measurement means to a reference amplitude with a prescribed reference deceleration time, and the peak value of said pulse signal is set by multiplying the ratio of a time width, obtained by multiplying said amplitude ratio by a reference movement time, to the movement time measured by said movement time measurement means, with a prescribed reference peak value.

12. The optical disc device according to claim 9, wherein said tracking control means comprises gain switching means which modifies the gain intersection point of the control loop, and said tracking control means switches the setting of said gain switching means for a prescribed length of time after operation of the track jumping means according to the ratio of the amplitude measured by said amplitude measurement means to a reference amplitude.

13. An optical disc device, comprising:
movement means, which moves the focal spot of a light beam focused on an information carrier in a direction to traverse a track on the information carrier;
detracking detection means, which generates a signal according to the positional relationship between the focal spot of the light beam and a track;
tracking control means, which drives said movement means according to the signal output from said detracking detection means, and executes control such that the focal spot of the light beam scans on a track; and, track jumping means, which moves the focal spot of the light beam from a first track on the information carrier to an adjacent second track; and wherein said track jumping means comprises acceleration means which applies to said movement means an acceleration signal to accelerate the light beam, deceleration means which applies to said movement means a deceleration signal to decelerate the light beam which has been accelerated by said acceleration means, first amplitude measurement means which measures the amplitude of the signal output from said detracking detection means during operation of said acceleration means, second amplitude measurement means which measures the amplitude of the signal output from said detracking detection means during operation of said deceleration means, and movement time measurement means which measures the length of time from the time of initiation of movement of the light beam by said track jumping means until a prescribed location between said first track and said second track is reached;

said acceleration means modifies the length of time of the acceleration signal based on the amplitude measured by said first amplitude measurement means; and, said deceleration means modifies the length of time and peak value of the deceleration signal based on the amplitude measured by said second amplitude measurement means and on the time measured by said movement time measurement means.

14. The optical disc device according to claim 13, wherein the acceleration signal output by said acceleration means comprises a pulse signal of prescribed peak value, and the time width of said pulse signal is set by multiplying the ratio of the amplitude measured by said first amplitude measurement means to a reference amplitude with a prescribed reference acceleration time.

15. The optical disc device according to claim 13, wherein the deceleration signal output by said deceleration means comprises a pulse signal, the time width of said pulse signal is set by multiplying the amplitude ratio of the amplitude measured by said second amplitude measurement means to a reference amplitude with a prescribed reference deceleration time, and the peak value of said pulse signal is set by multiplying the ratio of a time width, obtained by multiplying said amplitude ratio by a reference movement time, to the movement time measured by said movement time measurement means, with a prescribed reference peak value.

16. The optical disc device according to claim 13, wherein said tracking control means comprises gain switching means which modifies the gain intersection point of the control loop, and said tracking control means switches the setting of said gain switching means for a prescribed length of time after operation of the track jumping means according to the ratio of the amplitude measured by said second amplitude measurement means to a reference amplitude.

17. An optical disc device, comprising:

movement means, which moves the focal spot of a light beam focused on an information carrier having a plurality of stacked data surfaces in a direction substantially perpendicular to the data surfaces;

convergence state detection means, which generates a signal according to the convergence state of the light beam;

focusing control means, which drives said movement means according to the signal output from said convergence state detection means, and controls the focus position of the light beam so as to be substantially constant; and, focus jumping means, which moves the focal spot of the light beam from a first data surface on the information carrier to an adjacent second data surface; and wherein said focus jumping means comprises acceleration means which applies to said movement means an acceleration signal to accelerate the light beam, deceleration means which applies to said movement means a deceleration signal to decelerate the light beam which has been accelerated by said acceleration means, and amplitude measurement means which measures the amplitude of the signal output from said convergence state detection means during operation of said acceleration means;

said acceleration means modifies the length of time of the acceleration signal based on the amplitude measured by said amplitude measurement means; and, said deceleration means modifies the length of time of the deceleration signal based on the amplitude measured by said amplitude measurement means.

18. The optical disc device according to claim 17, wherein the acceleration signal output by said acceleration means comprises a pulse signal of prescribed peak value, and the time width of said pulse signal is set by multiplying the ratio of the amplitude measured by said amplitude measurement means to a reference amplitude with a prescribed reference acceleration time.

19. The optical disc device according to claim 17, wherein the deceleration signal output by said deceleration means comprises a pulse signal of prescribed peak value, and the time width of said pulse signal is set by multiplying the ratio of the amplitude measured by said amplitude measurement means to a reference amplitude with a prescribed reference deceleration time.

20. The optical disc device according to claim 17, wherein said focusing control means comprises gain switching means which modifies the gain intersection point of the control loop, and said focusing control means switches the setting of said gain switching means for a prescribed length of time after operation of the focus jumping means according to the ratio of the amplitude measured by said amplitude measurement means to a reference amplitude.

21. An optical disc device, comprising:

movement means, which moves the focal spot of a light beam focused on an information carrier having a plurality of stacked data surfaces in a direction substantially perpendicular to the data surfaces;

convergence state detection means, which generates a signal according to the convergence state of the light beam;

focusing control means, which drives said movement means according to the signal output from said convergence state detection means, and controls the focus position of the light beam so as to be substantially constant; and, focus jumping means, which moves the focal spot of the light beam from a first data surface on the information carrier to an adjacent second data surface; and wherein said focus jumping means comprises acceleration means which applies to said movement means an acceleration signal to accelerate the light beam, deceleration means which applies to said movement means a deceleration signal to decelerate the light beam which has been accelerated by said acceleration means, first amplitude measurement means which measures the amplitude of the signal output from said convergence state detection means during operation of said acceleration means, and second amplitude measurement means which measures the amplitude of the signal output from said convergence state detection means during operation of said deceleration means;

said acceleration means modifies the length of time of the acceleration signal based on the amplitude measured by said first amplitude measurement means; and, said deceleration means modifies the length of time of the deceleration signal based on the amplitude measured by said second amplitude measurement means.

22. The optical disc device according to claim 21, wherein the acceleration signal output by said acceleration means comprises a pulse signal of prescribed peak value, and the time width of said pulse signal is set by multiplying the ratio of the amplitude measured by said first amplitude measurement means to a reference amplitude with a prescribed reference acceleration time.

23. The optical disc device according to claim 21, wherein the deceleration signal output by said deceleration means comprises a pulse signal of prescribed peak value, and the time width of said pulse signal is set by multiplying the ratio of the amplitude measured by said second amplitude measurement means to a reference amplitude with a prescribed reference deceleration time.

24. The optical disc device according to claim 21, wherein said focusing control means comprises gain switching means which modifies the gain intersection point of the control loop, and said focusing control means switches the setting of said gain switching means for a prescribed length of time after operation of the focus jumping means according to the ratio of the amplitude measured by said second amplitude measurement means to a reference amplitude.

25. An optical disc device, comprising:

movement means, which moves the focal spot of a light beam focused on an information carrier having a plurality of stacked data surfaces in a direction substantially perpendicular to the data surfaces;

convergence state detection means, which generates a signal according to the convergence state of the light beam;

focusing control means, which drives said movement means according to the signal output from said convergence state detection means, and controls the focus position of the light beam so as to be substantially constant; and, focus jumping means, which moves the focal spot of the light beam from a first data surface on the information carrier to an adjacent second data surface; and wherein said focus jumping means comprises acceleration means which applies to said movement means an acceleration signal to accelerate the light beam, deceleration means which applies to said movement means a deceleration signal to decelerate the light beam which has been accelerated by said acceleration means, amplitude measurement means which measures the amplitude of the signal output from said convergence state detection means during operation of said acceleration means, and movement time measurement means which measures the length of time from the initiation of movement of the light beam by said focus jumping means until an intermediate layer or a location near the boundary between said first data surface and said second data surface is reached;

said acceleration means modifies the length of time of the acceleration signal based on the amplitude measured by said amplitude measurement means; and, said deceleration means modifies the length of time and the peak value of the deceleration signal based on the amplitude measured by said amplitude measurement means and on the time measured by said movement time measurement means.

26. The optical disc device according to claim 25, wherein the acceleration signal output by said acceleration means comprises a pulse signal of prescribed peak value, and the time width of said pulse signal is set by multiplying the ratio of the amplitude measured by said amplitude measurement means to a reference amplitude with a predetermined reference acceleration time.

27. The optical disc device according to claim 25, wherein the deceleration signal output by said deceleration means comprises a pulse signal, the time width of said pulse signal is set by multiplying the amplitude ratio of the amplitude measured by said amplitude measurement means to a reference amplitude with a prescribed reference deceleration time, and the peak value of said pulse signal is set by multiplying the ratio of a time width, obtained by multiplying said amplitude ratio by a reference movement time, to the movement time measured by said movement time measurement means, with a prescribed reference peak value.

28. The optical disc device according to claim 25, wherein said focusing control means comprises gain switching means which modifies the gain-intersection point of the control loop, and said focusing control means switches the setting of said gain switching means for a prescribed length of time after operation of the focus jumping means according to the ratio of the amplitude measured by said amplitude measurement means to a reference amplitude.

29. An optical disc device, comprising:

movement means, which moves the focal spot of a light beam focused on an information carrier having a plurality of stacked data surfaces in a direction substantially perpendicular to the data surfaces;

convergence state detection means, which generates a signal according to the convergence state of the light beam;

focusing control means, which drives said movement means according to the signal output from said convergence state detection means, and controls the focus position of the light beam so as to be substantially constant; and, focus jumping means, which moves the focal spot of the light beam from a first data surface on the information carrier to an adjacent second data surface; and wherein said focus jumping means comprises acceleration means which applies to said movement means an acceleration signal to accelerate the light beam, deceleration means which applies to said movement means a deceleration signal to decelerate the light beam which has been accelerated by said acceleration means, first amplitude measurement means which measures the amplitude of the signal output from said convergence state detection means during operation of said acceleration means, second amplitude measurement means which measures the amplitude of the signal output from said convergence state detection means during operation of said deceleration means, and movement time measurement means which measures the length of time from the initiation of movement of the light beam by said focus jumping means until an intermediate layer or a location near the boundary between said first data surface and said second data surface is reached;

said acceleration means modifies the length of time of the acceleration signal based on the amplitude measured by said first amplitude measurement means; and, said deceleration means modifies the length of time and peak value of the deceleration signal based on the amplitude measured by said second amplitude measurement means and on the time measured by said movement time measurement means.

30. The optical disc device according to claim 29, wherein the acceleration signal output by said acceleration means comprises a pulse signal of prescribed peak value, and the time width of said pulse signal is set by multiplying the ratio of the amplitude measured by said first amplitude measurement means to a reference amplitude with a prescribed reference acceleration time.

31. The optical disc device according to claim 29, wherein the deceleration signal output by said deceleration means comprises a pulse signal, the time width of said pulse signal is set by multiplying the amplitude ratio of the amplitude measured by said second amplitude measurement means to a reference amplitude with a prescribed reference deceleration time, and the peak value of said pulse signal is set by multiplying the ratio of a time width, obtained by multiplying said amplitude ratio by a reference movement time, to the movement time measured by said movement time measurement means, with a prescribed reference peak value.

32. The optical disc device according to claim 29, wherein said focusing control means comprises gain switching means which modifies the gain intersection point of the control loop, and said focusing control means switches the setting of said gain switching means for a prescribed length of time after operation of the focus jumping means according to the ratio of the amplitude measured by said second amplitude measurement means to a reference amplitude.

33. A track jumping control circuit for moving the focal spot of a light beam from a first track on an information carrier to an adjacent second track, comprising:

an acceleration portion which creates an acceleration signal to accelerate the light beam;

a deceleration portion which creates a deceleration signal to decelerate the light beam which has been accelerated by the acceleration signal; and, an amplitude measurement portion which, during acceleration of the light beam by the acceleration signal, measures the amplitude of a tracking error signal the amplitude of which changes according to the positional relationship between the focal spot of the light beam and a track; and wherein said acceleration portion modifies the length of time of the acceleration signal based on the amplitude measured by said amplitude measurement portion; and, said deceleration portion modifies the length of time of the deceleration signal based on the amplitude measured by said amplitude measurement portion.

34. A track jumping control circuit for moving the focal spot of a light beam from a first track on an information carrier to an adjacent second track, comprising:

an acceleration portion which creates an acceleration signal to accelerate the light beam;

a deceleration portion which creates a deceleration signal to decelerate the light beam which has been accelerated by the acceleration signal;

a first amplitude measurement portion which, during acceleration of the light beam by the acceleration signal, measures the amplitude of a tracking error signal the amplitude of which changes according to the positional relationship between the focal spot of the light beam and a track; and, a second amplitude measurement portion which, during deceleration of the light beam by the deceleration signal, measures the amplitude of the tracking error signal; and wherein said acceleration portion modifies the length of time of the acceleration signal based on the amplitude measured by said first amplitude measurement portion; and, said deceleration portion modifies the length of time of the deceleration signal based on the amplitude measured by said second amplitude measurement portion.

35. A track jumping control circuit for moving the focal spot of a light beam from a first track on an information carrier to an adjacent second track, comprising:

an acceleration portion which creates an acceleration signal to accelerate the light beam;

a deceleration portion which creates a deceleration signal to decelerate the light beam which has been accelerated by the acceleration signal;

an amplitude measurement portion which, during acceleration of the light beam by the acceleration signal, measures the amplitude of a tracking error signal the amplitude of which changes according to the positional relationship between the focal spot of the light beam and a track; and, a movement time measurement portion which measures the length of time from the initiation of movement of the light beam by the acceleration signal until a prescribed location is reached between said first track and said second track; and wherein said acceleration portion modifies the length of time of the acceleration signal based on the amplitude measured by said amplitude measurement portion; and, said deceleration portion modifies the length of time and peak value of the deceleration signal based on the amplitude measured by said amplitude measurement portion and on the time measured by said movement time measurement portion.

36. A track jumping control circuit for moving the focal spot of a light beam from a first track on an information carrier to an adjacent second track, comprising:

an acceleration portion which creates an acceleration signal to accelerate the light beam;

a deceleration portion which creates a deceleration signal to decelerate the light beam which has been accelerated by said acceleration signal;

a first amplitude measurement portion which, during acceleration of the light beam by the acceleration signal, measures the amplitude of a tracking error signal the amplitude of which changes according to the positional relationship between the focal spot of the light beam and a track;

a second amplitude measurement portion which, during deceleration of the light beam by the deceleration signal, measures the amplitude of the tracking error signal; and, a movement time measurement portion which measures the length of time from the initiation of movement of the light beam by the acceleration signal until a prescribed location is reached between said first track and said second track; and wherein said acceleration portion modifies the length of time of the acceleration signal based on the amplitude measured by said first amplitude measurement portion; and, said deceleration portion modifies the length of time and peak value of the deceleration signal based on the amplitude measured by said second amplitude measurement portion and on the time measured by said movement time measurement portion.

37. A focus jumping control circuit for moving the focal spot of a light beam from a first data surface on an information carrier having a plurality of stacked data surfaces to an adjacent second data surface, comprising:
an acceleration portion which creates an acceleration signal to accelerate the light beam;
a deceleration portion which creates a deceleration signal to decelerate the light beam which has been accelerated by the acceleration signal; and,
an amplitude measurement portion which, during acceleration of the light beam by the acceleration signal, measures the amplitude of a focusing error signal the amplitude of which changes according to the convergence state of the light beam; and wherein
said acceleration portion modifies the length of time of the acceleration signal based on the amplitude measured by said amplitude measurement portion; and,
said deceleration portion modifies the length of time of the deceleration signal based on the amplitude measured by said amplitude measurement portion.

38. A focus jumping control circuit for moving the focal spot of a light beam from a first data surface on an information carrier having a plurality of stacked data surfaces to an adjacent second data surface, comprising:
an acceleration portion which creates an acceleration signal to accelerate the light beam;
a deceleration portion which creates a deceleration signal to decelerate the light beam which has been accelerated by the acceleration signal;
a first amplitude measurement portion which, during acceleration of the light beam by the acceleration signal, measures the amplitude of a focusing error signal the amplitude of which changes according to the convergence state of the light beam; and,
a second amplitude measurement portion which, during deceleration of the light beam by the deceleration signal, measures the amplitude of the focusing error signal; and wherein
said acceleration portion modifies the length of time of the acceleration signal based on the amplitude measured by said first amplitude measurement portion; and,
said deceleration portion modifies the length of time of the deceleration signal based on the amplitude measured by said second amplitude measurement portion.

39. A focus jumping control circuit for moving the focal spot of a light beam from a first data surface on an information carrier having a plurality of stacked data surfaces to an adjacent second data surface, comprising:
an acceleration portion which creates an acceleration signal to accelerate the light beam;
a deceleration portion which creates a deceleration signal to decelerate the light beam which has been accelerated by the acceleration signal;
an amplitude measurement portion which, during acceleration of the light beam by the acceleration signal, measures the amplitude of a focusing error signal the amplitude of which changes according to the convergence state of the light beam; and,
a movement time measurement portion, which measures the length of time from the initiation of movement of the light beam by the acceleration signal until an intermediate layer or a location near the boundary between said first data surface and said second data surface is reached; and wherein
said acceleration portion modifies the length of time of the acceleration signal based on the amplitude measured by said amplitude measurement portion; and,
said deceleration portion modifies the length of time and peak value of the deceleration signal based on the amplitude measured by said amplitude measurement portion and on the time measured by said movement time measurement portion.

40. A focus jumping control circuit for moving the focal spot of a light beam from a first data surface on an information carrier having a plurality of stacked data surfaces to an adjacent second data surface, comprising:
an acceleration portion which creates an acceleration signal to accelerate the light beam;
a deceleration portion which creates a deceleration signal to decelerate the light beam which has been accelerated by the acceleration signal;
a first amplitude measurement portion which, during acceleration of the light beam by the acceleration signal, measures the amplitude of a focusing error signal the amplitude of which changes according to the convergence state of the light beam;
a second amplitude measurement portion which, during deceleration of the light beam by the deceleration signal, measures the amplitude of the focusing error signal; and,
a movement time measurement portion, which measures the length of time from the initiation of movement of the light beam by the acceleration signal until an intermediate layer or a location near the boundary between said first data surface and said second data surface is reached; and wherein
said acceleration portion modifies the length of time of the acceleration signal based on the amplitude measured by said first amplitude measurement portion; and,
said deceleration portion modifies the length of time and peak value of the deceleration signal based on the amplitude measured by said second amplitude measurement portion and on the time measured by said movement time measurement portion.

* * * * *